United States Patent [19]

Miyamoto et al.

[11] Patent Number: 5,218,492
[45] Date of Patent: Jun. 8, 1993

[54] MAGNETIC RECORDING AND/OR REPRODUCING APPARATUS

[75] Inventors: Ritsu Miyamoto; Shigeyuki Kuroha; Hirofumi Ishii, all of Yokohama; Shinji Tezuka, Tokyo; Hiroshi Yoshizawa, Kawasaki; Kazuaki Baba, Yokohama, all of Japan

[73] Assignee: Victor Company of Japan, Ltd., Yokohama, Japan

[21] Appl. No.: 713,354

[22] Filed: Jun. 13, 1991

[30] Foreign Application Priority Data

Jun. 14, 1990 [JP] Japan .................. 2-155893
Jun. 14, 1990 [JP] Japan .................. 2-155894
Jun. 14, 1990 [JP] Japan .................. 2-155895

[51] Int. Cl.⁵ ............................. G11B 33/02
[52] U.S. Cl. ............................. 360/85; 360/95
[58] Field of Search .............. 360/85, 95, 81, 96.1, 360/96.3

[56] References Cited

U.S. PATENT DOCUMENTS 4,775,904 10/1988 Kimura et al. .................. 360/85
5,070,422 12/1991 Sasaki et al. .................. 360/85
5,109,723 5/1992 Kato .................. 360/85

Primary Examiner—Paul M. Dzierzynski
Assistant Examiner—Richard Hanig
Attorney, Agent, or Firm—Lowe, Price, LeBlanc & Becker

[57] ABSTRACT

A low-profile magnetic recording and/or reproducing apparatus is disclosed in which a drum is disposed substantially in front of a supply reel disc, a capstan and a pinch roller are disposed substantially in front of a take-up reel disc, a reel clutch mechanism extends from the capstan to a position located between the supply reel disc and the take-up reed disc, and a drive mechanism for driving a tape loading mechanism, a tape tension servo mechanism, a pinch roller displacement mechanism, etc. comprises a gear train disposed in a space extending arcuately along the drum and defined between the drum, supply reel disc, reel clutch mechanism and the capstan. Since the drive mechanism thus arranged does not overlap any of the components which are controlled in thickness by the width of a magnetic tape, a substantial reduction of the overall thickness of the apparatus is possible.

20 Claims, 22 Drawing Sheets

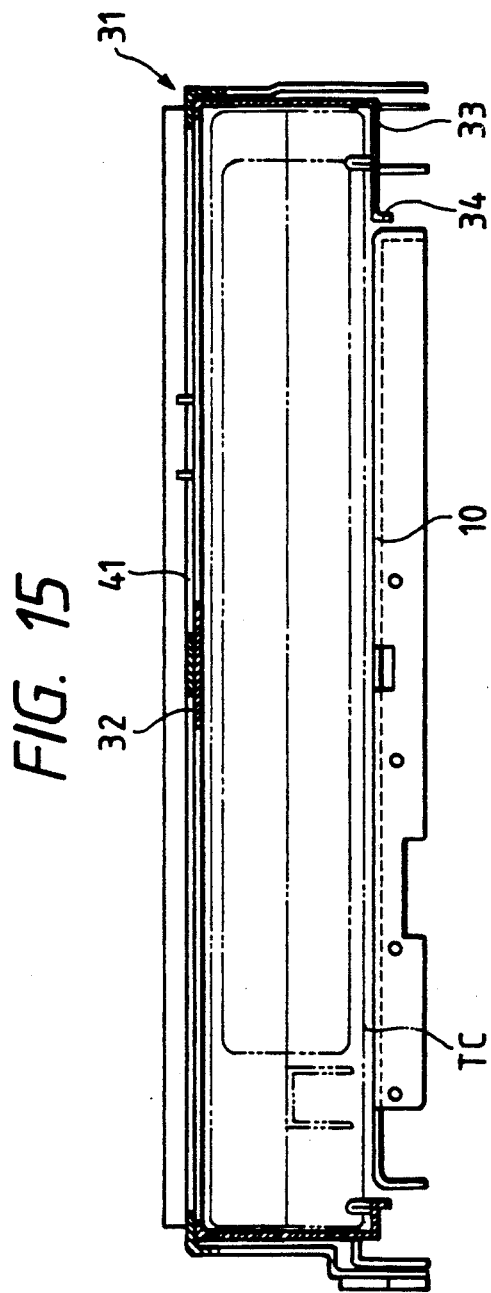
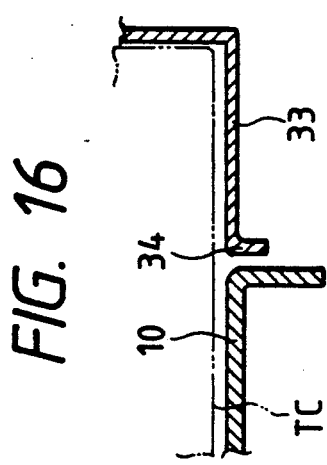
FIG. 15
FIG. 16

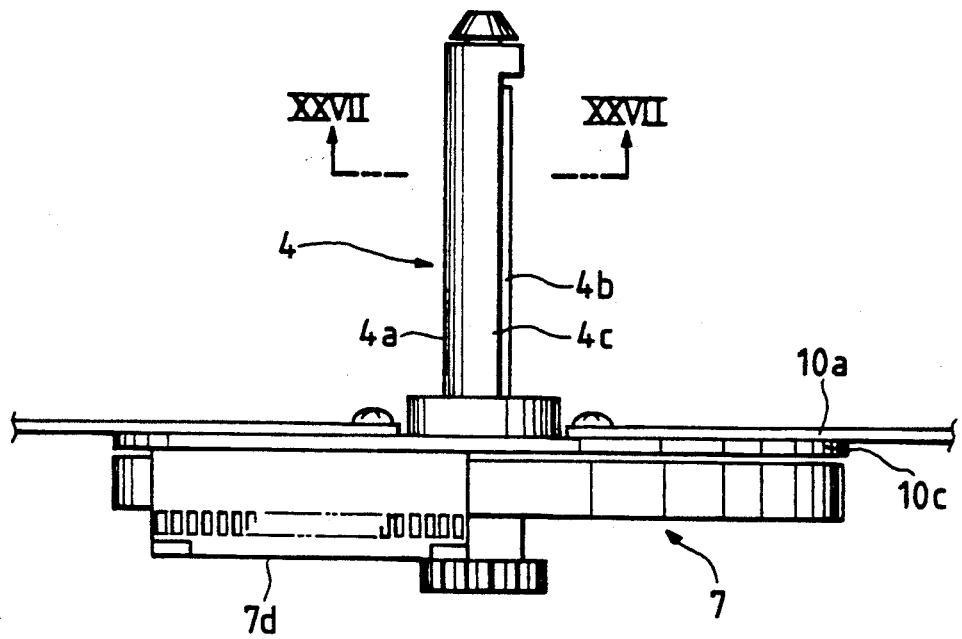
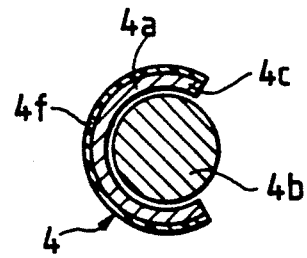
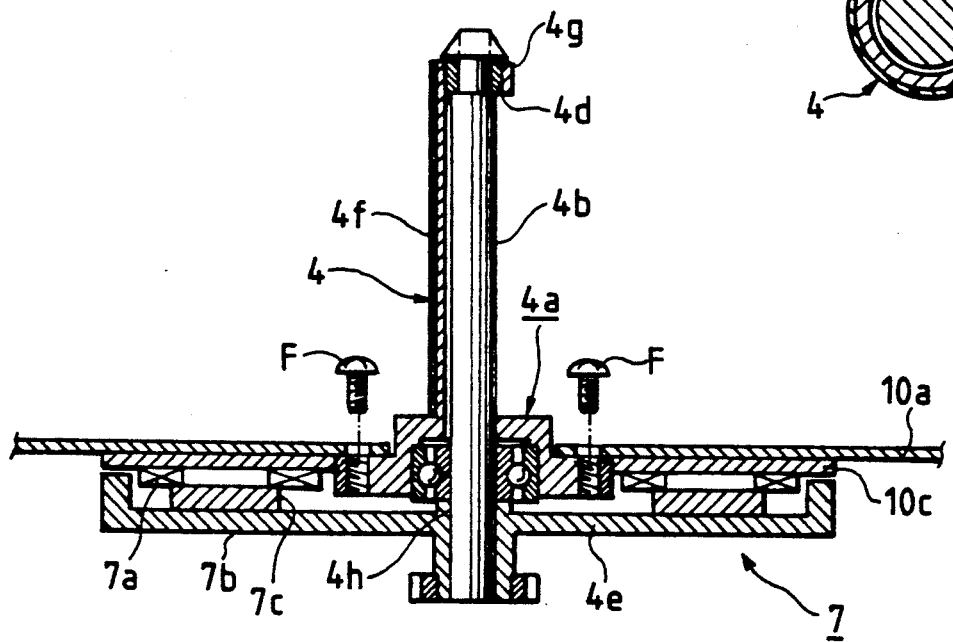

$M_b = \frac{W\ell}{4}$ $M_b = \frac{W\ell}{2}$

MAGNETIC RECORDING AND/OR REPRODUCING APPARATUS

BACKGROUND OF THE INVENTION

1. Field of the Invention

The present invention relates to a magnetic tape recording and/or reproducing apparatus such as a video tape recorder (VTR), a digital audio tape recorder (DAT), etc.

2. Description of the Prior Art

Video tape recorders (VTRs) or digital audio tape recorders (DATs) generally comprise a tape loading mechanism by means of which a length of the tape extending between a supply reel and a take-up reel in a tape cassette is withdrawn from the tape cassette and is then wrapped around a rotary drum by a predetermined rotational angle. The rotary drum has at least one magnetic head. The tape while being wrapped around the rotary drum is gripped by a pinch roller and a capstan and fed in a direction to perform recording and reproducing operations.

The drum is rotated by a drum motor. The capstan and two reel discs engageable by reels in the cassette are rotated by a capstan motor. The tape loading mechanism, the pinch roller and other mechanisms are operatively connected to cams of a large-diameter cam gear via a number of connecting arms and levers so as to perform predetermined operations in response to rotation of the cam gear driven by another motor.

The rotary drum, pinch roller, capstan and reel discs have their respective heights which are determined depending on the width of the tape. It is therefore impossible to minimize the overall thickness of the magnetic recording and/or reproducing apparatus by reducing the profile of the foregoing components independently from the tape width.

On the other hand, a conventional drive mechanism includes a cam gear to which a number of arms, levers and plates are connected in superposed relation to the components specified above. With this superposed arrangement, a reduction of the overall thickness and weight of the magnetic recording and/or reproducing apparatus is substantially impossible.

Furthermore, in the conventional apparatus, main parts and mechanisms, such as a drum, reel discs, a tape loading mechanism and a tape traveling mechanism, are mounted on upper and lower surfaces of a single deck. This arrangement requires a tedious and time-consuming assembling work. In addition, the parts and mechanisms are exposed so that they are likely to be damaged and unsightly in appearance. Furthermore, a foreign matter can easily get into a clearance between movable parts, causing a malfunctioning of the apparatus. The single deck structure has a relatively low rigidity and can provide only a limited degree of freedom in arranging the component parts.

SUMMARY OF THE INVENTION

With the foregoing drawbacks of the prior art in view, it is an object of the present invention to provide a magnetic recording and/or reproducing apparatus which is extremely low in profile and light in weight.

Another object of the present invention to provide a magnetic recording and/or reproducing apparatus which is rigid in construction, sightly in appearance and easy to assemble.

According to a first aspect of the present invention, there is provided a magnetic recording and/or reproducing apparatus of the type including a drum having a rotary magnetic head, a supply reel disc and a take-up reel disc for being engaged by a supply reel and a take-up reel, respectively, of a magnetic tape cassette, a capstan driven by a capstan motor and co-acting with a pinch roller to travel a tape between the supply and take-up reels, a reel clutch mechanism for transmitting a driving force from the capstan motor to the reel discs, a tape loading mechanism for withdrawing a length of the magnetic tape from the tape cassette and wrapping the tape length around the drum by a predetermined rotational angle, a tape tension servo mechanism for controlling a tension on the tape at a predetermined level, a pinch roller displacement mechanism for moving the pinch roller toward and away from the capstan, a brake mechanism for braking the reel discs, and a drive mechanism for transmitting a driving force of a motor to a driven member of each of the tape loading mechanism, the tape tension servo mechanism, the pinch roller displacement mechanism and the brake mechanism to drive these mechanisms, all of the foregoing components and mechanisms being supported on a deck, characterized in that the drum is disposed substantially in front of the supply reel disc, the capstan and the pinch roller are disposed substantially in front of the take-up reel disc, the reel clutch mechanism extends from the capstan to a position located between the supply reel disc and the take-up reed disc, and the drive mechanism includes a gear train composed of a plurality of cam gears meshing with each other, each of the cam gears having at least one cam operatively connected with the driven member of each of the tape loading mechanism, the tape tension servo mechanism, the pinch roller displacement mechanism and the brake mechanism for controlling operation of the respective mechanisms, the gear train being disposed in a space extending arcuately along the drum and defined between the drum, the supply reel disc, the reel clutch mechanism and the capstan.

Since the drive mechanism for driving the tape loading mechanism, the pinch roller, etc. is disposed between the rotary drum, the pinch roller, the capstan and reel discs which are restricted in height by the width of the tape, the overall thickness of the magnetic recording and/or reproducing apparatus can be reduced to a minimum.

According to a second aspect of the present invention, there is provided a magnetic recording and/or reproducing apparatus of the type including a drum having a rotary magnetic head, a supply reel disc and a take-up reel disc for being engaged by a supply reel and a take-up reel, respectively, of a magnetic tape cassette, a capstan driven by a capstan motor and co-acting with a pinch roller to travel a tape between the supply and take-up reels, a reel clutch mechanism for transmitting a driving force from the capstan motor to the reel discs, a tape loading mechanism for withdrawing a length of the magnetic tape from the tape cassette and wrapping the tape length around the drum by a predetermined rotational angle, a tape tension servo mechanism for controlling a tension on the tape at a predetermined level, a pinch roller displacement mechanism for moving the pinch roller toward and away from the capstan, a brake mechanism for braking the reel discs, and a drive mechanism for transmitting a driving force of a motor to each of the tape loading mechanism, the tape tension servo mechanism, the pinch roller displacement mechanism and the brake mechanism to drive the latter, a deck supporting all of the components and mechanisms, a holder for receiving therein the tape cassette, and a support mechanism for supporting the holder such that the holder is movable toward and away from the deck, characterized in that the deck is composed of an upper main deck and a lower deck joined together with a space defined therebetween, the drive mechanism is disposed in the space in the deck, and the holder includes a bottom wall having an opening, the opening being receptive of an upper wall of the main deck until the upper wall extends substantially flush with the bottom wall of the holder when the holder is disposed near the deck.

Since the upper wall of the main deck extends substantially flush with the bottom wall of the holder, the tape cassette loaded in the holder is placed in a position immediately adjacent to the upper wall of the main deck. With this construction, additional reduction of the thickness of the apparatus is possible. The deck is of a box-like structure and hence has a larger rigidity than a conventional single deck. In addition, the drive mechanism disposed within the deck is free from contamination with dust or foreign matter and the apparatus is, therefore, durable in construction and reliable in operation.

The above and other objects, features and advantages of the present invention will become more apparent from the following description when making reference to the detailed description and the accompanying sheets of drawings in which preferred structural embodiments incorporating the principles of the present invention are shown by way of illustrative examples.

BRIEF DESCRIPTION OF THE DRAWINGS

FIG. 15 is a cross-sectional view taken along line XV—XV of FIG. 12, showing a holder located close to a deck;

FIG. 16 is an enlarged cross-sectional view taken along line XVI—XVI of FIG. 12;

FIG. 25 is a side view of a capstan shaft holding structure of the apparatus according to the invention;

FIG. 26 is a longitudinal cross-sectional view of FIG. 25;

FIG. 27 is a cross-sectional view taken along line XXVII—XXVII of FIG. 25;

DETAILED DESCRIPTION OF THE PREFERRED EMBODIMENTS

Figure 2:
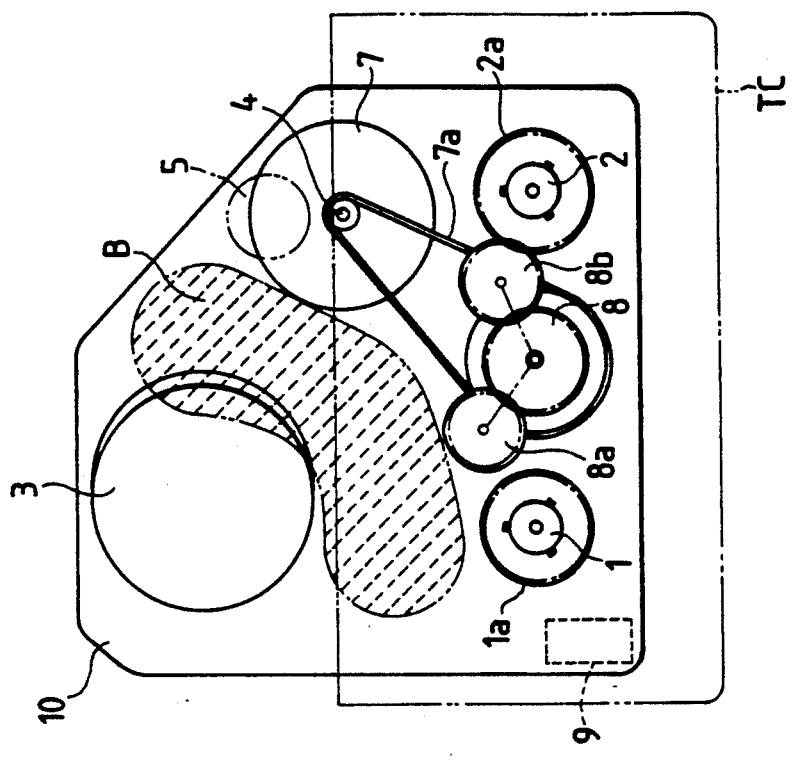
FIGS. 1 and 2 are diagrammatical plan views showing the positional relationship between a region in which a drive mechanism is disposed, and other members of a magnetic recording and/reproducing apparatus.

The present invention will be described in greater detail with reference to certain preferred embodiments shown in the accompanying drawings in which like reference characters designate like or corresponding parts throughout the several views.

Figure 1:
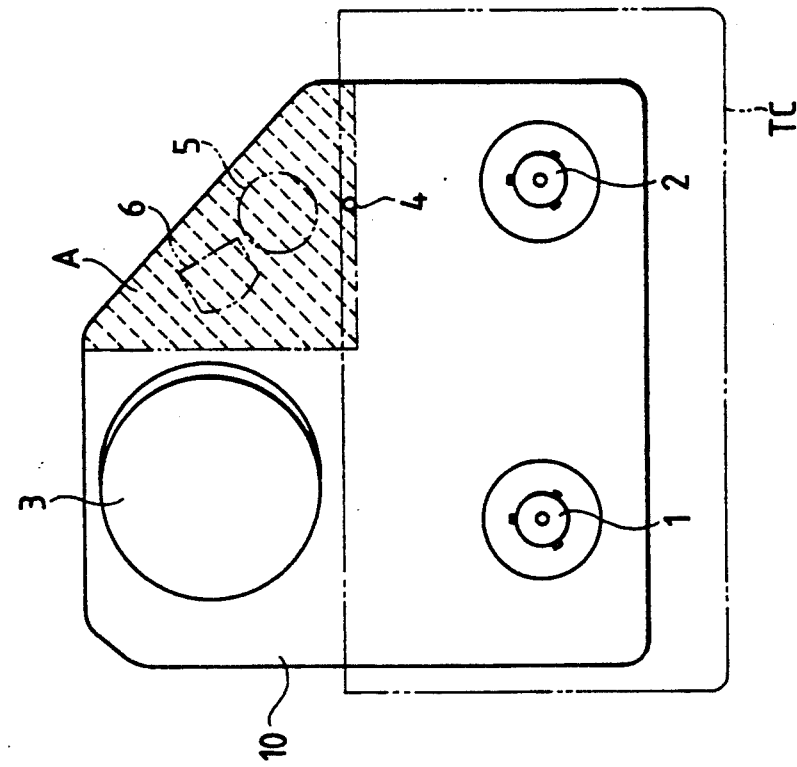

The description given below is directed first to the positional relationship between a zone provided for the arrangement of an drive mechanism, and other members of a magnetic recording and/or reproducing apparatus embodying the present invention. The apparatus comprises a certain number of components which are controlled by the width of a magnetic tape such that the height of each component is not less than the width of the magnetic tape. Those components, as shown in FIGS. 1 and 2, include a supply reel disc 1, a take-up reel disc 2, a rotary drum 3, a capstan 4, a pinch roller 5 and an audio and control (A/C) head 6. The supply reel disc 1 and the take-up reel disc 2 are located at a front side of a deck 10. The rotary drum 3 is located at a back left side of the deck 10. At the remaining side (namely, the back right side) of the deck 10, there is provided a substantially triangular zone A indicated by hatching as shown in FIG. 1 in which zone A, the capstan 4, pinch roller 5 and A/C head 6 are disposed in a concentrative manner. The capstan 4 is rotated by a capstan motor 7 mounted on the deck 10. The rotation of the capstan motor 7 is transmitted through an endless belt 7a to a reel clutch 8. The reel clutch 8 has a pair of small gears 8a, 8b which are selectively brought into meshing engagement with a gear 1a on the supply reel disc 1 and a gear 2a on the take-up reel disc 2, respectively, under a frictional force produced when the capstan motor 7 rotates in forward and reverse directions.

Figure 3:
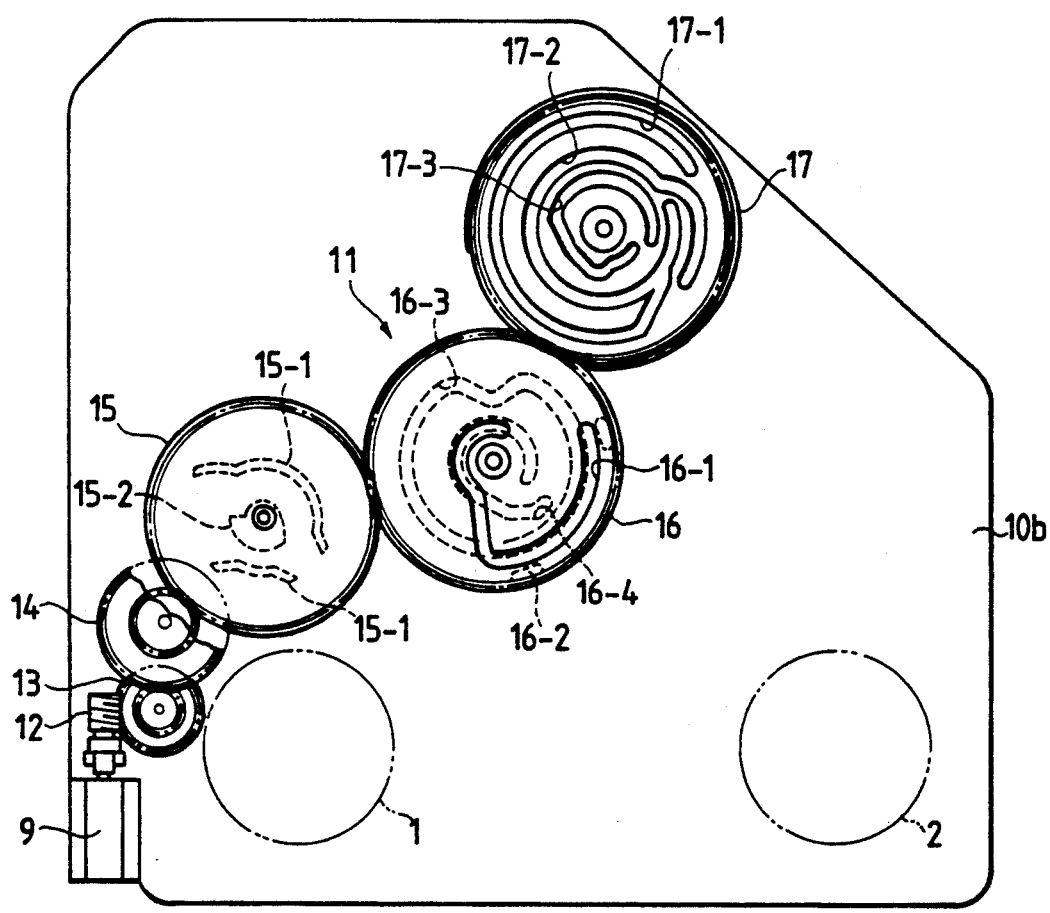
FIG. 3 is a plan view showing a gear train constituting the drive mechanism of the magnetic recording and/or reproducing apparatus.

A motor 9 (FIG. 2) for driving a pinch roller arm, a tape loading mechanism and a tension arm (all of them being described later) is disposed on the deck 10 at a position diagonally opposite to the triangular zone A in which the capstan 4, pinch roller 5 and A/C head 6 are disposed. A driving force from the motor 9 is transmitted to the pinch roller arm and other driven members via a drive mechanism 11 (FIG. 3). The drive mechanism 11 comprises a gear train disposed in a zone B which extends without interference with the reel discs 1, 2, the drum 3, the capstan 4, the pinch roller 5, the capstan motor 7 and the reel clutch 8.

Figure 4:
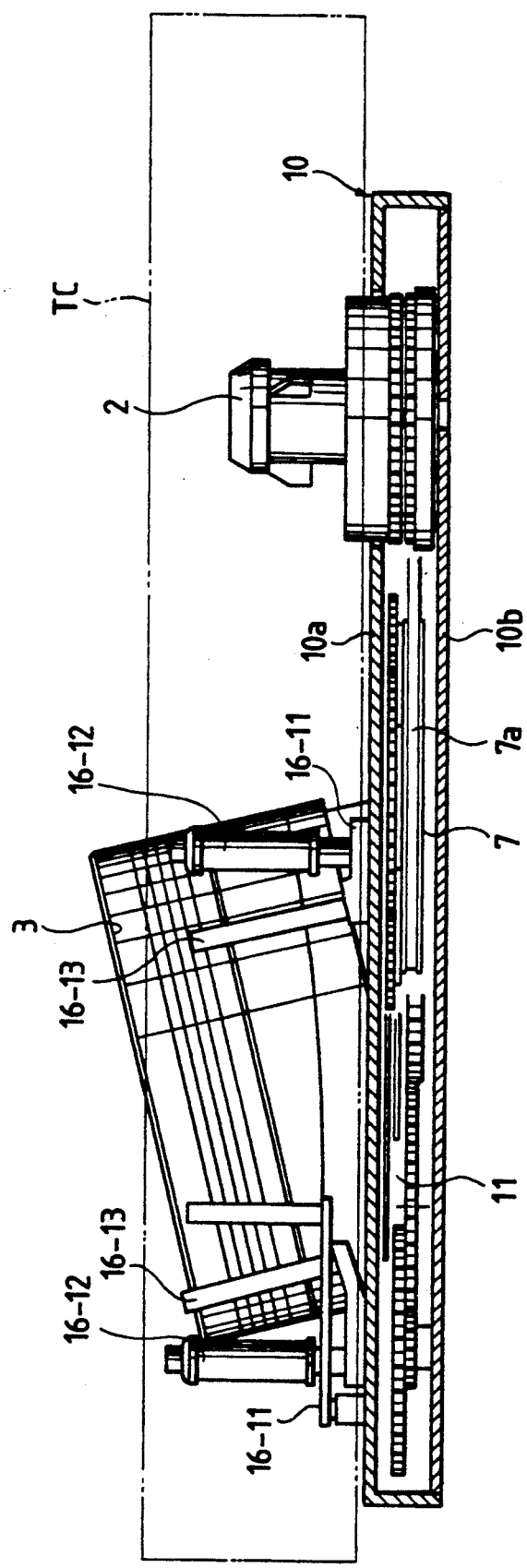
FIG. 4 is a cross-sectional view showing an arrangement of the drive mechanism.

The deck 10 includes, as shown in FIG. 4, an upper main deck 10a and a lower deck 10b superimposed with each other with a space defined therebetween so as to jointly form a box. The reel discs 1, 2, the drum 3, the capstan 4, the pinch roller 5 have their respective upper ends disposed above the upper surface of the main deck 10a. The drive mechanism 11 including the motor 9 is disposed in the space defined between the main deck 10a and the lower deck 10b. The front side of the upper surface of the main deck 10a, which is adapted to underlie a tape cassette TC when the latter is loaded, is substantially flat so that the main deck 10a can be brought to a level immediately adjacent to the tape cassette TC. This construction is effective to reduce the overall thickness of the magnetic recording and/or reproducing apparatus. The drum 4 is disposed at the back left of the upper surface of the main deck 10a. The capstan 4, the pinch roller 5, the A/C head 6, a guide pole (described later), and a half-loading pole (described later) are gathered at the back right on the upper surface of the main deck 10a as they must be high at least equal to the width of the magnetic tape in the tape cassette TC. The A/C head 6 is secured to the upper surface of the main deck 10a and the capstan motor 7 is disposed in the space between the main deck 10a and the lower deck 10b. The reel clutch 8 is mounted on the underside of the main deck 10a and driven by the capstan motor 7 via the belt 7a.

As shown in FIG. 3, the gear train constituting the drive mechanism 11 is constructed to transmit the rotation of the motor 9 through a worm 12 to a first reduction gear 13 whose rotation is transmitted to a second reduction gear 14. The rotation of the second reduction gear 14 is then transmitted successively through a first cam bear 15, a second cam gear 16 and a third cam gear 17. Among these cam gears 15-17, the first cam gear 15 has a smallest outside diameter and the second and third cam gears 16, 17 have a same outside diameter. The third cam gear 17 incorporates therein a rotary encoder, not shown.

The cam gears 15-17 and corresponding driven members will be described below in greater detail.

Figure 5:
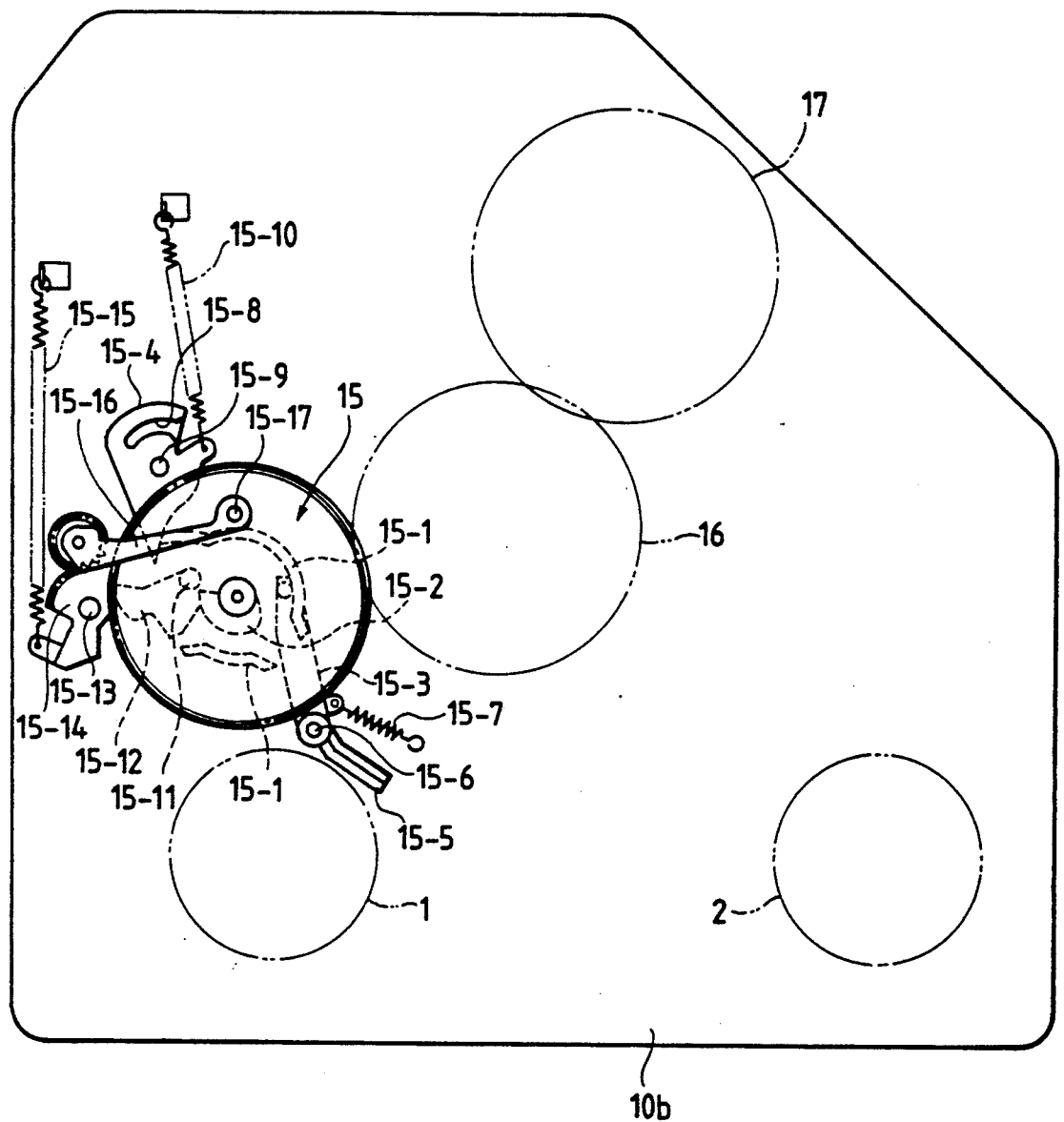
FIG. 5 is a plan view showing a first cam gear of the drive mechanism and those members which are driven by the first cam gear.

FIG. 5 is a plan view illustrative of the first cam gear 15 and those members which are driven by the first cam gear 15. The first cam gear 15 has on its under side a first cam 15-1 and a second cam 15-2. The first cam 15-1 is an interrupted projection and engageable with an end of a sub-brake arm 15-3 and an end of a pole base lever 15-4.

The sub-brake arm 15-3 has a brake shoe 15-5 at a front end thereof and is pivotally supported by a shaft 15-6. The sub-brake arm 15-3 is urged by a spring 15-7 to turn clockwise in FIG. 5 about the shaft 15-6.

The pole base lever 15-4 has an arcuate groove 15-8 for receiving therein a pole base of the loading arm. The pole base lever 15-4 is pivotally supported by a shaft 15-9 and is urged by a spring 15-10 to turn counterclockwise in FIG. 5 about the shaft 15-9.

The second cam 15-2 is disposed at the center of the first cam gear 15 and engageable with a cancel arm 15-12 which is rotatable about a shaft 15-11. The lower deck 10b supports thereon a transfer arm 15-14 rotatable about a shaft 15-13 and urged by a spring 15-15 to turn clockwise about the shaft 15-13. The transfer arm 15-14 has a gear meshing with a gear on a boss of a tension arm 15-16. The tension arm 15-16 has an apertured front end in which a tension pole 15-17 is inserted. The tension arm 15-16 and the tension pole 15-17 constitute a part of a tape tension servo mechanism.

Figure 6:
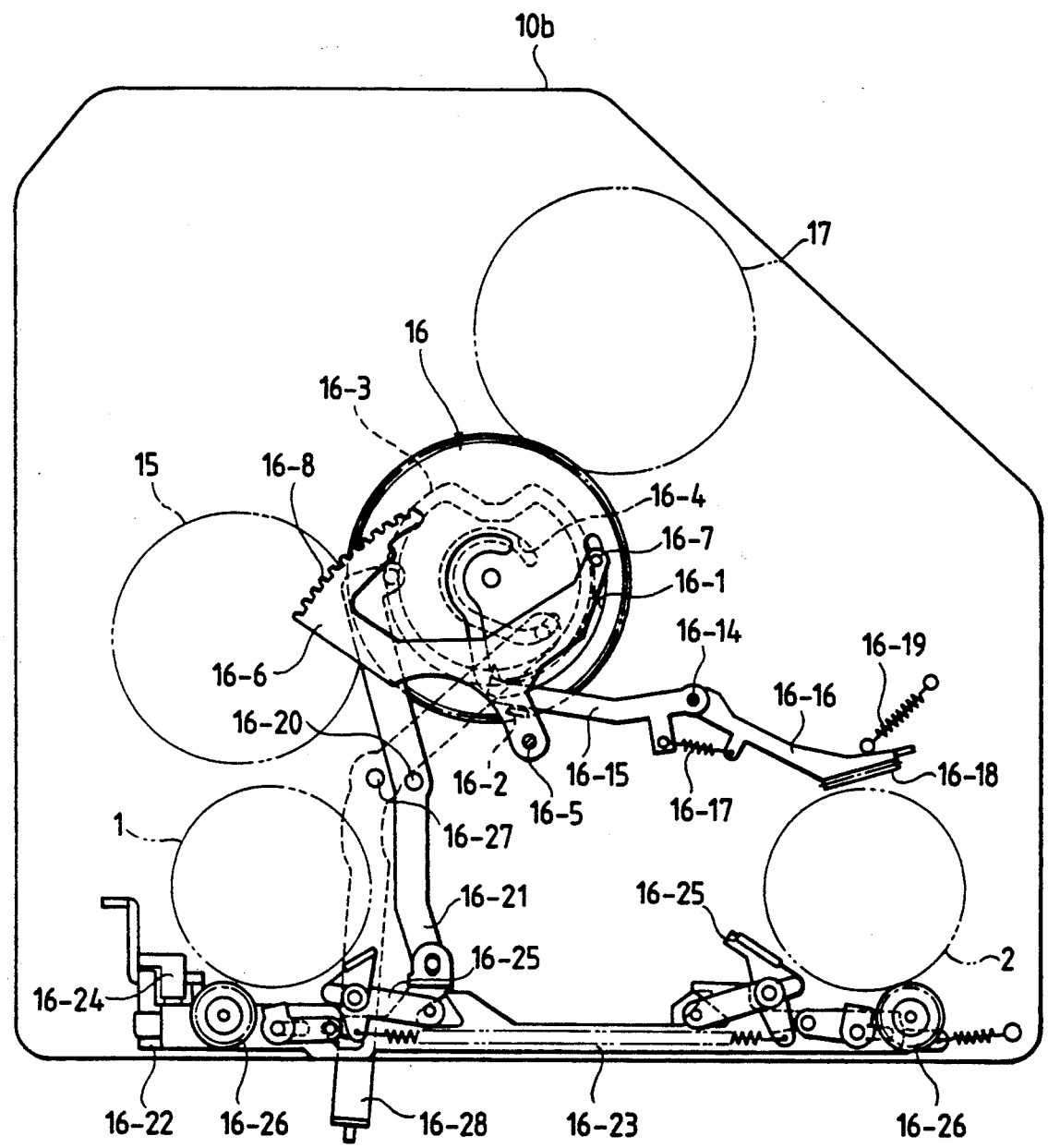
FIG. 6 is a plan view showing a second cam gear of the drive mechanism and those members which are driven by the second cam gear.

FIG. 6 is a plan view showing the second cam gear 16 and those members which are driven by the second cam gear 16. The second cam gear 16 has on its upper surface a first cam groove 16-1 and a cam projection 16-2 and, in its under surface, a second cam groove 16-3 and a third cam groove 16-4.

Figure 8:
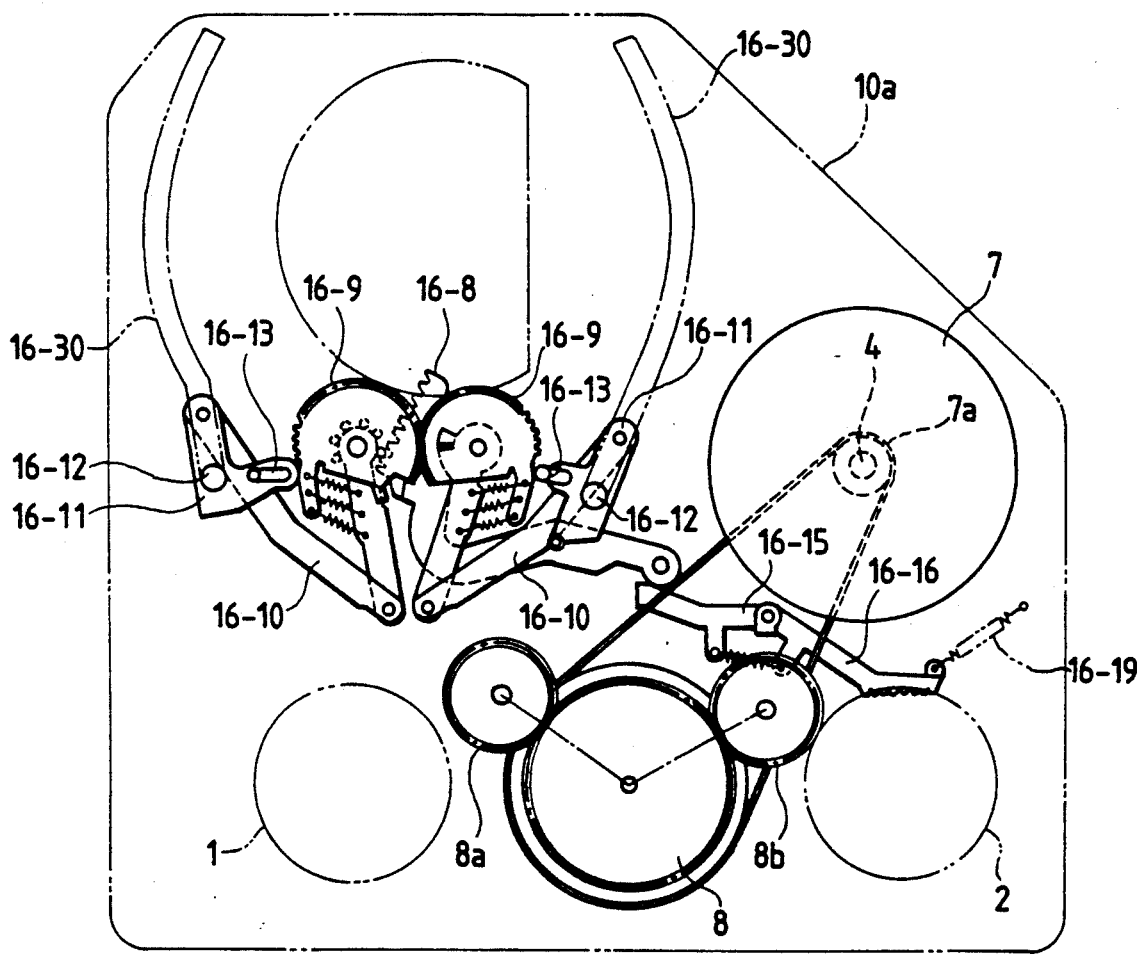
FIG. 8 is a plan view showing a tape loading mechanism and a reel clutch mechanism.
Figure 9:
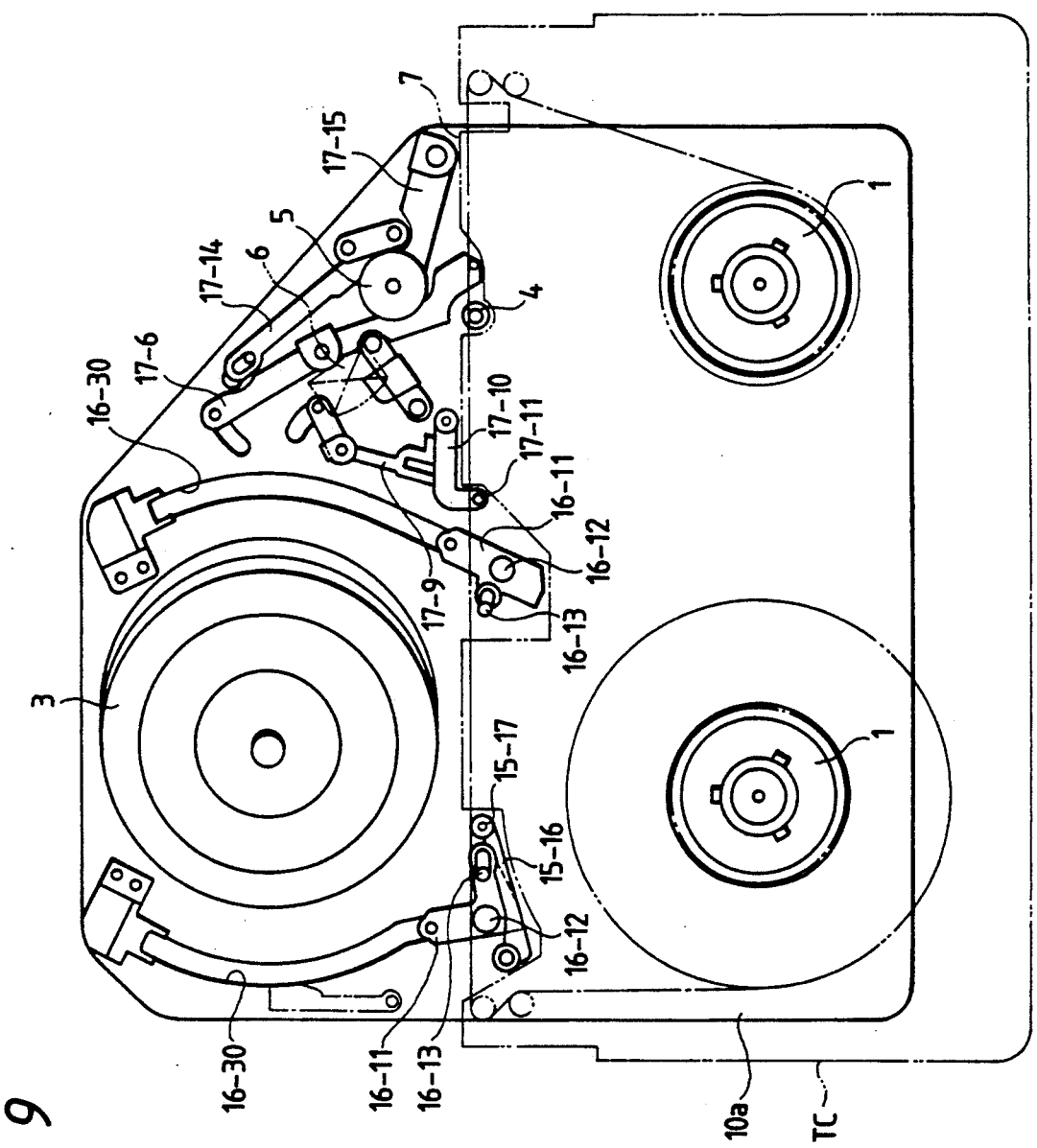
FIG. 9 is a plan view of the apparatus with parts shown in a condition prior to the loading of a magnetic tape.

The first cam groove 16-1 is engaged by a pin 16-7 with one end of an arm gear 16-6 which is pivotally supported by a shaft 16-5. The arm gear 16-6 has a gear 16-8 meshing with one of a pair of loading gears 16-9, 16-9 disposed on the underside of the main deck 10a, as shown in FIG. 8. The loading gears 16-9 have central shafts integral with a pair of loading arms 16-10, 16-10, respectively. Each of the loading arms 16-10 has an intermediate articulation or joint and is connected at its front end with a loading base 16-11. The loading bases 16-11 are slidably received in a pair of curved guide slots 16-30 (FIGS. 8 and 9), respectively, formed in the main deck 10a and extending along the drum 3 at diametrically opposite sides thereof. Each of the loading bases 16-11 supports thereon an upstanding loading pole 16-12 and an oblique pole 16-13 (see FIG. 4). The loading arms 16-10, the bases 16-11, and the loading poles 16-12 constitute a part of a tape loading mechanism.

A pair of sub-brake arms 16-15, 16-16 is mounted on the underside of the main deck 10a by a shaft 16-14 with a spring 16-17 acting between the sub-brake arms 16-15 and 16-15, as shown in FIG. 6. One of the sub-brake arms 16-15 has a front end disposed in a path of rotational movement of the cam projection 16-2, while the other sub-brake arm 16-16 has a brake shoe 16-18 on its front end. The sub-brake arm 16-16 is urged by a spring 16-19 to turn counterclockwise about the shaft 16-14. The sub-brake arms 16-15, 16-16, the brake shoe 16-18, the sub-brake arm 15-3 and the brake shoe 15-5 constitute a part of a brake mechanism for the reel discs 1, 2.

The second cam groove 16-3 is engaged with a proximal end of a lever 16-21 which is pivotally movable about a shaft 16-20. The front end of the lever 16-21 is connected with a slide plate 16-22 slidably disposed on the front side of the lower deck 10b. On the upper surface of the slide plate 16-22, an F/R plate 16-23 is superimposed such that the F/R plate 16-23 and the slide plate 16-22 are brought into and out of engagement with each other by a joint member 16-24. The slide plate 16-22 and the F/R plate 16-23 are engaged with main brakes 16-25 and a portion of reel gears 16-26 so that a predetermined operation begins in response to the sliding movement of the slide plate 16-22 and the R/F plate 16-23, as described later.

The third cam groove 16-4 is engaged with a proximal end of an eject lever 16-28 which is pivotally mounted by a shaft 16-27 on the underside of the lower deck 10b for performing a forcible locking of a cassette housing, as described later.

Figure 7:
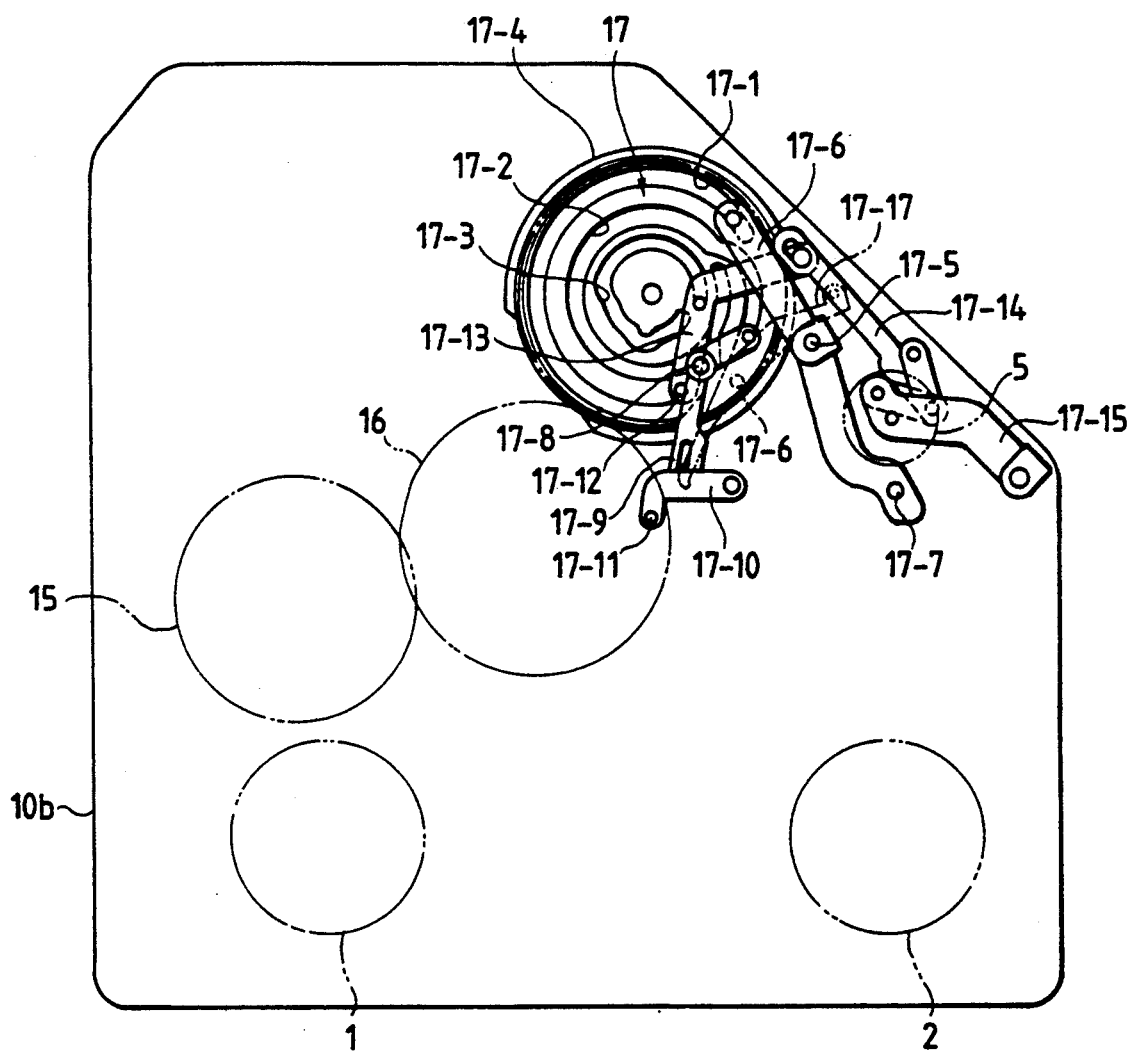
FIG. 7 is a plan view showing a third cam gear of the drive mechanism and those members which are driven by the third cam gear.

FIG. 7 is a plan view showing the third cam gear 17 and those members which are driven by the third cam gear 17. The third cam gear 17 has in its upper surface a first cam groove 17-1, a second cam groove 17-2 and a third cam groove 17-3, and also includes a circumferential cam 17-4 on an outer peripheral surface thereof.

The first cam groove 17-1 is engaged with a proximal end of a guide arm 17-6 which is urged clockwise about a shaft 17-5 and supports on its front end an upstanding guide pole 17-7.

The second cam groove 17-2 is engaged with one end of a lever 17-9 supported on a shaft 17-8, the opposite end of the lever 17-9 being connected to an intermediate portion of a pivoted half-loading arm 17-10. The half-loading arm 17-10 is urged to turn clockwise abut a shaft (not designated) and supports on its front end a half-loading pole 17-11.

The third cam groove 17-3 is engaged with an intermediate portion of a lever 17-13 supported on a shaft 17-12. The lever 17-13 is connected at its front end with a lever 17-14 which is in turn connected to a pinch roller arm 17-15. The levers 17-13 and 17-14 and the pinch roller arm 17-15 constitute a part of a pinch roller displacement mechanism.

The circumferential cam 17-4 is engaged with an intermediate portion of a capstan brake lever 17-17 which is urged counterclockwise about a shaft 17-16.

Figure 11:
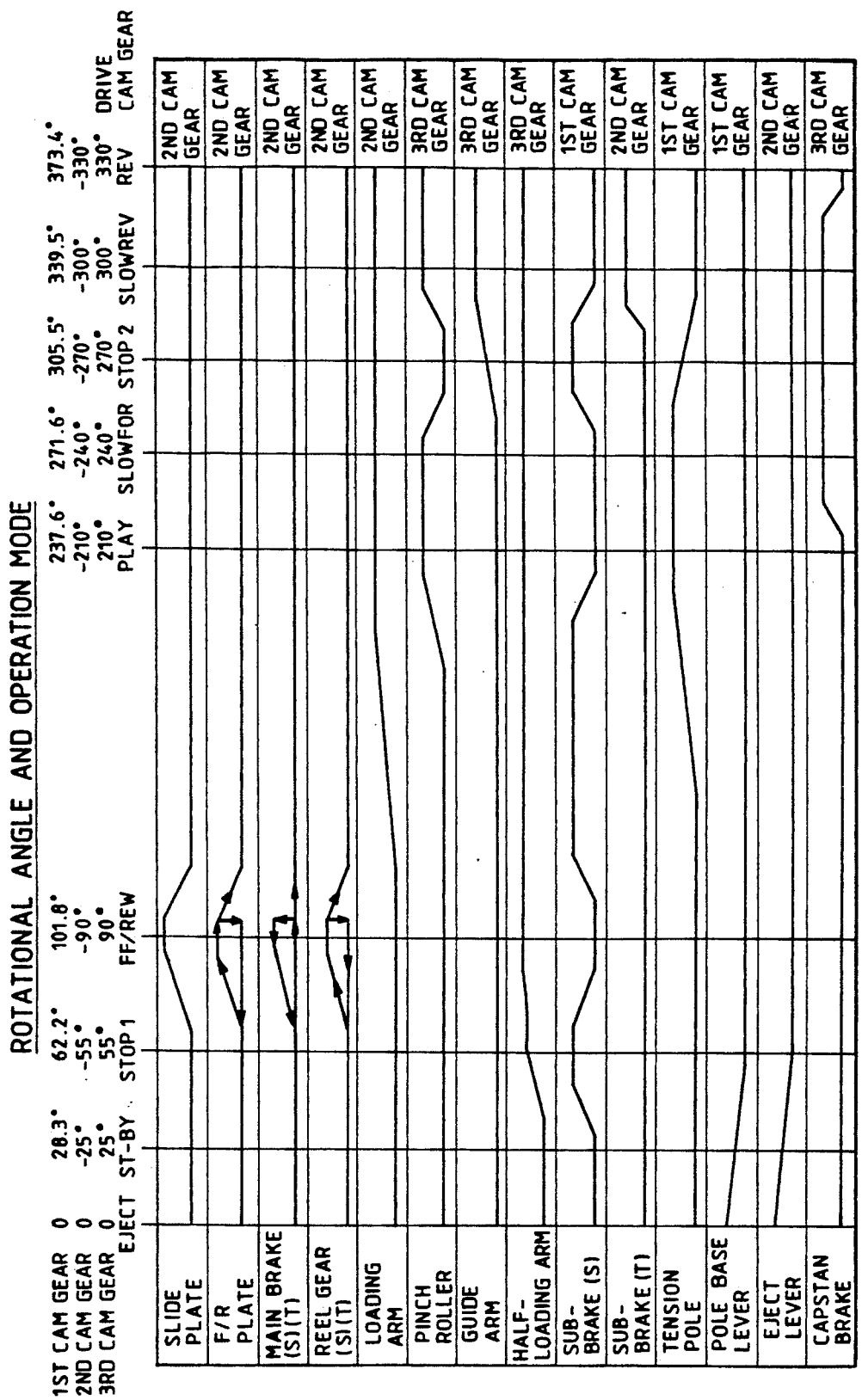
FIG. 11 is a graphical representation of various modes of operation of movable parts of the apparatus in response to the rotation of the cam gears.

Operation of respective members driven by the drive mechanism 11 (a driving force transmission mechanism) of the foregoing construction will be described below with reference to a mode table shown in FIG. 11 in which the relation between the rotational angle of the first to third cam gears 15-17 and various modes of operation of the driven members is illustrated.

The operation begins with parts of the magnetic recording/reproducing apparatus held in a stand-by (ST-BY) mode in which the first cam gear 15 is turned from a reference position by an angle of +28.3 degrees, the second cam gear 16 is turned from a reference position by an angle of −25 degrees, and the third cam gear 17 is turned from a reference position by an angle of +25 degrees.

While keeping this condition, an eject button is depressed or actuated whereupon the motor 9 is rotated in a reverse direction to turn the first cam gear 15 in the counterclockwise direction (reverse direction) through an angle of 28.3 degrees, thereby causing the second cam gear 16 to turn clockwise (forward direction) through an angle of 25 degrees and also causing the third cam gear 17 to turn counterclockwise through an angle of 25 degrees. During that time, the first cam 15-1 on the first cam gear 15 engages the pole base lever 15-4 to turn it in the clockwise direction so that the pole base 16-11 mounted on the front end of the loading arm is moved into a predetermined position. At the same time, the eject lever 16-28 engaged with the cam groove 16-4 of the second cam gear 16 turns in the counterclockwise direction to release the cassette housing whereupon the cassette housing is tilted up into an ejected position by the force of springs.

Then, after a tape cassette is loaded in the cassette housing, the cassette housing is depressed whereupon the motor 9 is rotated in the forward direction such as to depart from the standby mode. As the motor 9 further turns forwardly, the half-loading arm 17-10 engaged with the cam groove 17-2 in the third cam gear 17 is turned in the clockwise direction to pull a length of a magnetic tape out from the tape cassette until it reaches to a half-loading position. Simultaneously therewith, the sub-brake arm 15-3 engaged with the cam 15-1 of the first cam gear 15 turns in the clockwise direction to move the brake shoe 15-5 into contact with the supply reel disc 1, thereby preventing the tape from becoming slackened while the tape is being withdrawn.

In a STOP 1 mode, an FF (fast forward) button or an REW (rewind) button is actuated whereupon the lever 16-21 engaged with the cam groove 16-3 of the second cam gear 16 is turned in the clockwise direction to move the slide plate 16-22 and the R/F plate 16-23 in a direction to bring the real gear 16-26 into meshing engagement with the clutch gear 8a (FIG. 2) and also with the gear 1a (FIG. 2) on the supply reel disc 1 to avid slipping therebetween. When a stop button is actuated during the fast forwarding (FF) operation or the rewinding (REW) operation, the reel gear 16-26 is separated from the clutch gear 8a and the gear 1a on the supply reel disc 1 whereupon the main brake 16-25 immediately stops rotation of the supply reel disc 1 and the take-up reel disc 2.

Figure 10:
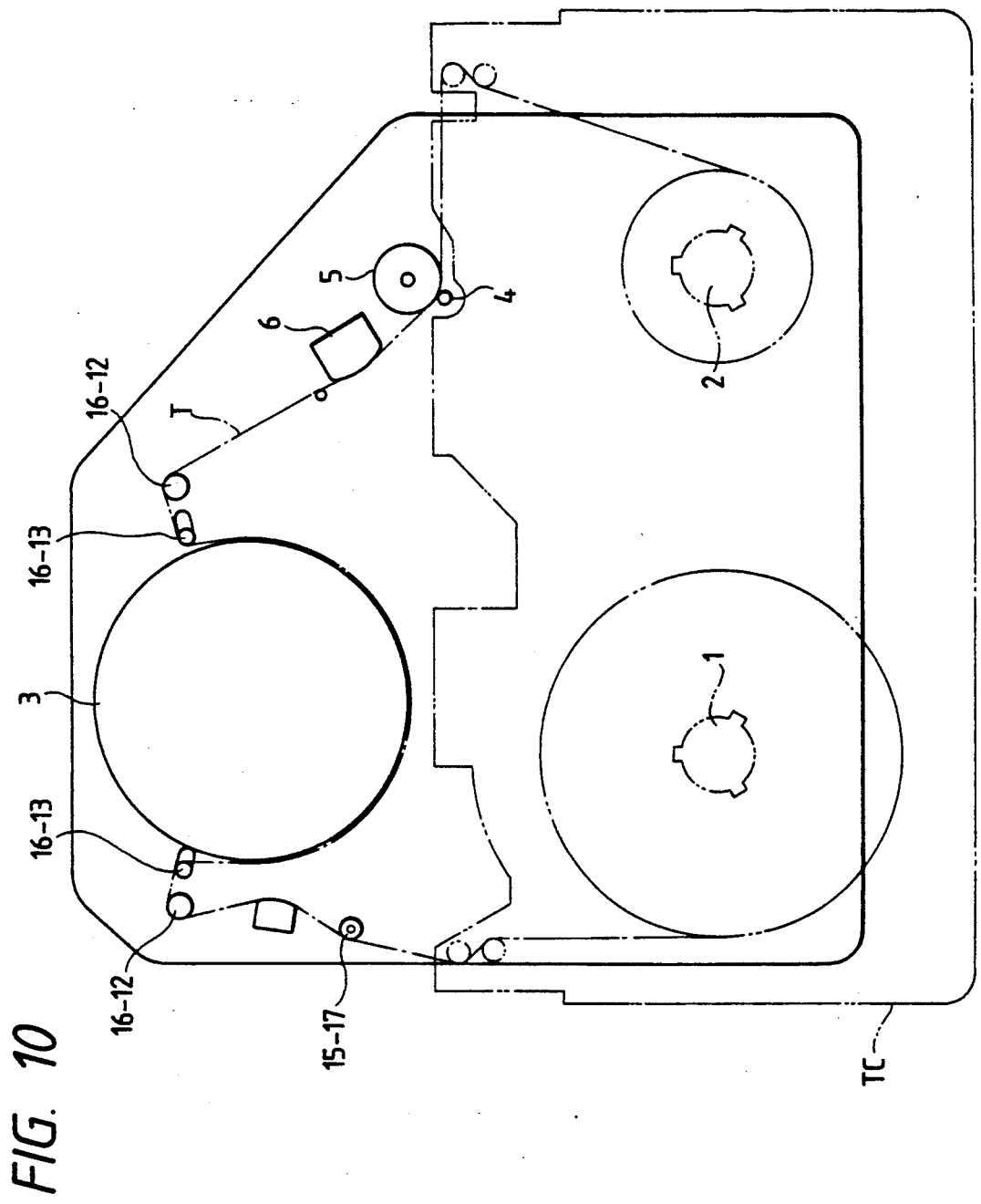
FIG. 10 is a plan view showing the apparatus with parts in a loading condition in which the magnetic tape is wrapped around a rotary drum by a predetermined rotational angle.

When the operation is changed from the STOP 1 mode to a PLAY mode, the sub-brake arm 15-3 is turned again in the clockwise direction to keep the tape against loosening while the tape is being withdrawn. The arm gear 16-6 engaged with the cam groove 16-1 of the second cam gear 16 is turned in the counterclockwise direction to cause the loading gears 16-9 and the loading arms 16-10 to turn in a direction until the loading poles 16-12 are displaced from an retracted standby position shown in FIG. 9 to an advanced loading position shown in FIG. 10. With this movement of the loading poles 16-12, the magnetic tape T is wrapped around the rotary drum 3 by a predetermined rotational angle. Slightly after the start of the operation of the loading mechanism, the cancel arm 15-12 engaged with the cam 15-2 of the first cam gear 15 is turned and disengaged from the transfer arm 15-14 whereupon the transfer arm 15-14 is turned clockwise by the force of the spring 15-15. The clockwise rotation of the transfer arm 15-14 causes the tension arm 15-16 to turn in the counterclockwise direction, thereby exerting a constant tension on the tape T. In addition, the start of the pivotal movement of the tension arm 15-16 is followed by a counterclockwise movement of the pinch roller arm 17-15 which is caused by the lever 17-13 held in engagement with the cam groove 17-3 in the third cam gear 17. With this movement of the pinch roller arm 17-15, the pinch roller 5 urges the tape T against the capstan 4 to grip the tape T therebetween and then travel the tape T at a constant speed.

In a slow forward (SLOWFOR) mode, the separated condition between the cam 15-1 of the first cam gear 15 and the sub-brake arm 15-3 is maintained as in the case of the PLAY mode. The capstan brake 17-17 engaging the circumferential cam 17-4 of the third cam gear 17 is brought into contact with a wheel on the capstan motor 7 to prevent reverse rotation of the capstan motor 7 when the tape T is fed intermittently.

In a stop (STOP) 2 mode, the pinch roller 5 is separated from the capstan 4 and the sub-brake on the supply side is turned on or made operative. In a slow reverse (SLOWREV) mode, the guide arm 17-6 held in engagement with the cam groove 17-1 in the third cam gear 17 is turned on or activated to feed the tape intermittently at a constant speed. During that time, the capstan brake 17-17 engaged with the circumferential cam 17-4 of the third cam gear 17 is held in contact with the wheel of the capstan motor 7. In a reverse (REV) mode and the SLOWREV mode, the capstan brake 17-17 is released from the wheel of the capstan motor 7. The cam projection 16-2 on the second cam gear 16 urges the sub-brake arm 16-16 on the take-up side to turn clockwise about the shaft 16-14 so that the brake shoe 16-18 is brought into contact with the take-up reel disc 2 to prevent the tape T from becoming slackened.

As described above, a pinch roller and its peripheral members are disposed in a position which is kept out of overlapping or superimposition with a rotary drum, supply and take-up reel discs and a reel clutch. The pinch roller and a loading mechanism are driven by a motor which is disposed on a deck at a position substantially diagonally opposite to the position of the pinch roller on the deck. A driving force from the motor is transmitted through a gear train to a pinch roller arm on which the pinch roller is supported. The gear train is composed of a plurality of cam gears and is disposed out of interference with any of the foregoing members mounted on the deck. With this construction, the overall thickness of the magnetic recording and/or reproducing apparatus can be reduced to a minimum and hence the overall size and weight of the apparatus are considerably reduced.

In addition, the deck has a double deck structure composed of an upper main deck and a lower deck superimposed with each other with a spaced therebetween. The drive mechanism for driving the tape loading mechanism, tape traveling mechanism, etc. is disposed in the internal space of the deck. The drive mechanism is easy to assemble and the degree of freedom in arranging component parts of the drive mechanism is increased to such an extent that a three-dimensional arrangement of the component parts is possible. With this three-dimensional arrangement, the thickness and hence the overall size of the apparatus can be reduced. Furthermore, the deck having a box-like structure is rigid and capable of protecting the internal component members against contamination with dust and intrusion of foreign matter. The magnetic recording and/or reproducing apparatus of this invention is particularly suitable when used in an all-in-one video camera and recorder (camcoder) or a portable VTR in which the internal mechanical structure can be observed from the outside of the unit. By using the box-like deck, the internal mechanical structure is concealed so that the product value of the unit is increased.

Figure 12:
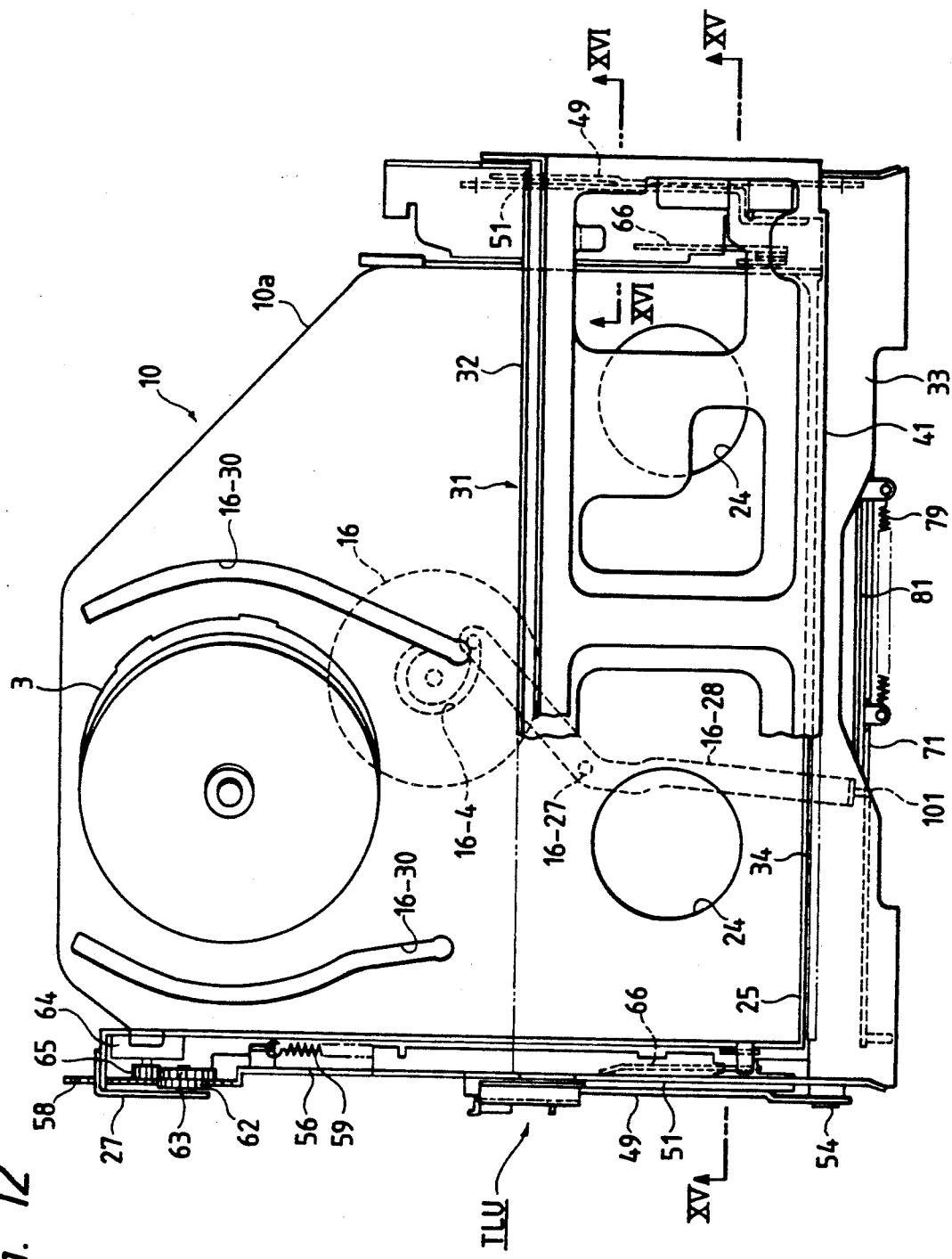
FIG. 12 is a plan view of a tape cassette loading unit with parts shown in a locking condition.
Figure 13:
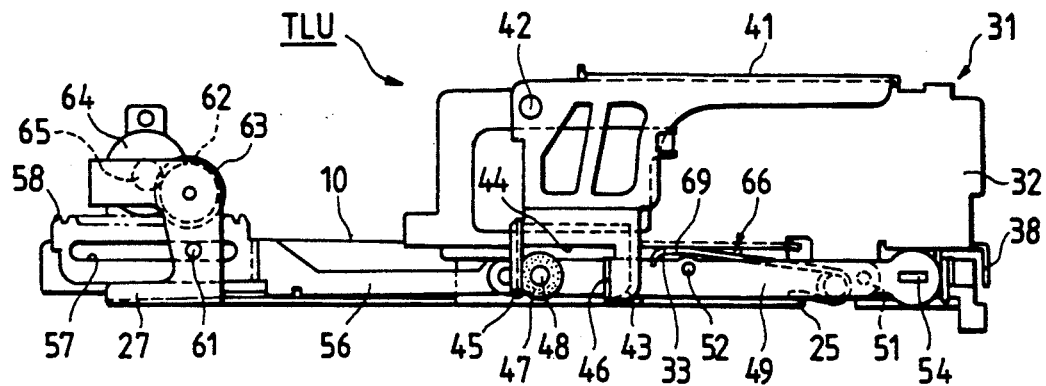
FIG. 13 is a side view of FIG. 12.
Figure 14:
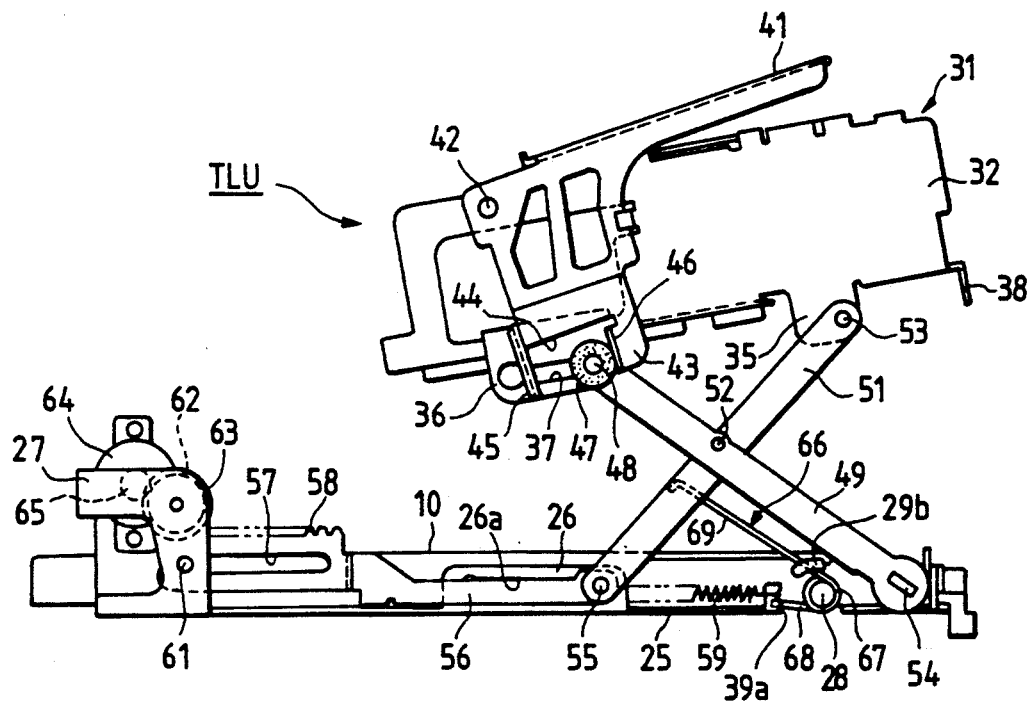
FIG. 14 is a side view of the tape cassette loading unit with parts shown in an ejected condition.

FIGS. 12 through 14 show a tape cassette loading unit TLU of the magnetic recording and/or reproducing apparatus according to the present invention. The tape cassette loading unit TLU includes a cassette housing 31 composed of a holder 32 and a plate 41 disposed above the holder 32 and pivotally connected by a pair of pins 42 to opposed side walls of the holder 32.

The holder 32 has a width larger than the width of the deck 10 and includes a bottom wall 33 having a large cutout opening 34 corresponding in position to the position of a part of the upper surface of the deck 10.

Figure 17A:
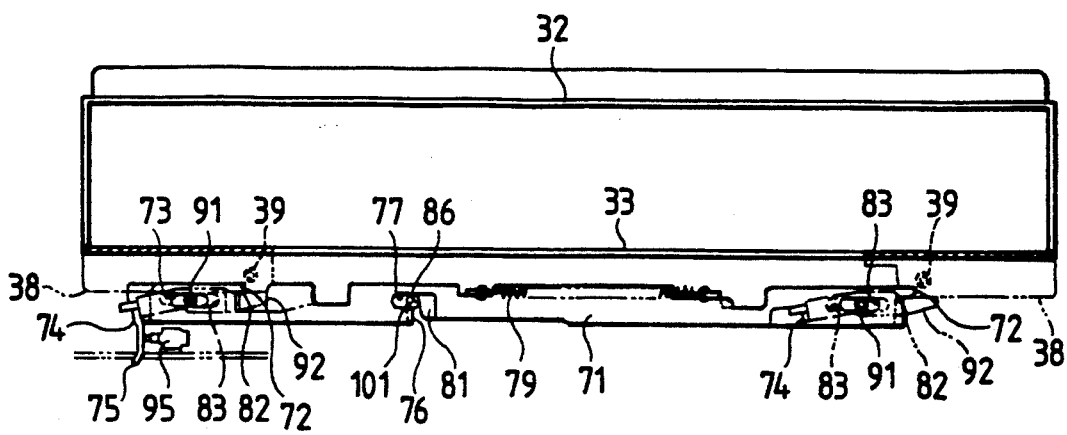
FIGS. 17(a) through 17(e) are front elevational views illustrative of various operational conditions of the tape cassette loading unit.

The holder 32 further has front and rear lugs 35, 36 (FIG. 14) extending downwardly from each of a pair of side walls of the holder 32, and left and right lugs 38, 38 (FIG. 17(a)) depending from the front edge of the bottom wall 33 of the holder 32. Each of the lugs 38 has a lock pin 39 (FIG. 17(a)) projecting rearward of the holder 32.

The plate 51 includes a pair of opposed, downwardly extending side lugs 43 each having an opening 44 and a pair of lateral projections 45, 46 located at opposite edges of the opening 44. A roller 47 is movably received between the lateral projections 45, 46 and rotatably mounted on a support pin 48. The support pin 48 extends loosely through an oblong hole 37 in the rear lug 36 of the holder 32 and is firmly connected to one end (an upper end) of a first support arm 49.

The first support arm 49 is pivotally connected at its central portion to the central portion of a second support arm 51 by means of a pin 52. The second support arm 51 has one end (an upper end) pivotally connected by a pin 53 to the front lug 35 of one side wall of the holder 32.

The lower ends of the first arms 49, 49 are joined together by a connecting shaft 54 which is rotatably supported by front end portions of the opposed side walls of a frame 25. The frame 25 extends along the deck 10 so as to embrace the front end and the opposite sides of the deck 10. The lower ends of the second support arms 51, 51 are connected to a pair of pins 55, respectively, slidably received in a pair of oblong holes 26a formed in a pair of upstanding support lug 26 on the side walls of the frame 25.

The pin 55 which is opposite to the pin 55 shown in FIGS. 13 and 14 is connected to one end of a tension spring (not shown), the opposite end of the tension spring being connected to the front portion of the side wall of the frame 25. The pin 55 shown in FIGS. 13 and 14 is pivotally connected to an elongate plate 56. A tension spring 59 extends between the plate 56 and the front portion of the side wall of the frame 25.

The plate 56 has a rear end portion formed with an oblong hole 57 and a rack 58 extending parallel to the oblong hole 57. The oblong hole 57 is fitted with a pin 61 fixed to a bracket 27 formed on the rear end portion of the side wall of the frame 25. The rack 58 meshes with a gear 62 rotatably mounted on the bracket 27. The gear 62 is concentrically integral with a gear 63 which is held in meshing engagement with a gear 65 of a damper 64 secured to the bracket 27.

A torsion spring 66 is mounted on a pin 28 secured to the front end portion of each side wall of the frame 25. The tension sprig 66 has a coiled portion 67 wound around the pin 28, a short lower arm 68 lockingly engaged with a first stopper 29a, and a long upper arm 69 projecting upwardly from the frame 25 and lockingly engageable with a second stopper 29b. The upper arm 69 of the torsion spring 66 is resiliently engageable with a corresponding one of a pair of opposite sides of the bottom wall 33 of the holder 32 to urge the holder 32 upwardly.

As shown in FIGS. 17(a)–17(e), a lock plate 71 and other component parts are disposed in front of the front end of the frame 25 via a front bracket (not shown).

The lock plate 71 is horizontally elongate and has, on its upper edge, left and right locking prongs 72, 72 and further is connected to the non-illustrated front bracket via a tension spring 79. A horizontally elongate slide plate 81 (identical to the slide plate 16-22 shown in FIG. 6) is disposed inwardly of the lock plate 71 and has left and right locking prongs 82, 82 on its upper edge.

The non-illustrated front bracket which is secured to the front end of the frame 25 is provided with left and right pins 91, 91 projecting forwardly. The forwardly projecting pins 91 extend successively through a pair of oblong holes 83 in the slide plate 81 and through a pair of oblong hole 73 in the lock plate 71. The front end of each of the pins 91 is pivotally connected to an arm 92 which is urged in the counterclockwise direction in FIGS. 17(a)-17(e) by means of a torsion spring (not shown).

Each of the arms 72 has a right end disposed at the right of the corresponding locking prong 72 of the lock plate 71, and a left end held on a corresponding one of a pair of locking lugs 74 of the lock plate 71. A switch actuating fin 75 extends downwardly from the left locking lug 74 and is engageable with a loading switch 95 to activate the same.

The lock plate 71 has at an intermediate portion thereof a cutout recess 76 and an oblong hole 77 communicating with the recess 76. The slide plate 81 has at its intermediate portion a cutout recess 86. The cutout recess 86 in the slide plate 81 and the oblong hole 77 in the lock plate 71 are engaged with a pin 101.

The pin 101, as shown in FIG. 12, is disposed on a front end of the eject lever 16-28. As described above, the eject lever 16-28 is disposed below the main deck 10a of the deck 10 and is pivoted at its intermediate portion by the shaft 16-27. The eject lever 16-28 is connected at its rear end to the cam groove 16-4 in the second cam gear 16 by means of a pin 104. The cam gear 16 is driven by the motor 9 (FIG. 3).

With the lock plate 71 and the slide plate 81 thus assembled, the locking prongs 82 of the slide plate 81 are disposed below the locking prongs 71 of the lock plate 71 by about 0.5 mm. In FIG. 12, a pair of circular holes formed in the main deck 10a for mounting the reel discs 1, 2 is designated by 24.

The tape cassette loading unit of the foregoing construction operates as follows.

For purposes of illustration, operation starts with parts of the tape cassette loading unit held in a stand-by position shown in FIG. 14. In this instance, the first and second support arms 49, 51 are raised into a substantially X-shape configuration and the cassette housing 31 is lifted up away from the deck 10. Then, a tape cassette, not shown, is placed into the holder 32 and, subsequently, the holder 32 is lowered to move the cassette housing 31 toward the deck 10.

The downward movement of the holder 32 causes the support arms 49, 51 to be folded into a recumbent position so that the holder 32 is disposed close to the upper surface of the deck 10 as shown in FIG. 13. During that time, the roller support pins 48 of the first support arms 49 slide rearward along the oblong holes 37 in the rear lugs 36 of the holder 32. At the same time, the rollers 47 abut against the lateral projections 45 of the side lugs 43 of the plate 41 to turn the plate 41 clockwise in FIG. 14 about the pins 44. The plate 41 is thus laid over the holders 12. On the other hand, the pins 55 of the second support arms 51 slide rearward along the oblong holes 26a in the support lugs 26 of the frame 25, so that the plate 56 is displaced rearward with its oblong hole 57 guided by the pin 61.

The folding movement of the support arms 49, 51 is performed against the force of the tension spring 59 and also against the force of the non-illustrated tension spring disposed at the opposite side of the tension spring 59. At the same time, the rearward movement of the plate 56 rotates the damper 64 via the operation of a gear train composed of the rack 58 on the plate 56, and gears 62, 63, 65 on the bracket 27. The damper 64 is a rotary damper containing a viscous fluid such as a high viscous oil. The damper 64 thus rotated does not produce a damping force.

In a locking condition shown in FIG. 13, the support arms 49, 51 are fully folded into a recumbent posture extending along the side walls of the frame 25 of the deck 10. The respective torsion springs 66 mounted on the pins 28 of the side walls of the frame 25 have respective upper arms 69 forced downward by the lower surface 33 of the holder 32. As best shown in FIGS. 15 and 17, the upper wall of the deck 10 is received in the opening 34 of the bottom wall 33 of the holder 32 and extends substantially flush with the bottom wall 33 of the holder 32.

Such flushing arrangement of the bottom wall 33 of the holder 32 and the upper wall of the deck 10 is held by a lock mechanism which will be described below with reference to FIGS. 17(a)-17(e).

FIG. 17(a) shows an unlocked condition or a stand-by state. In this condition, the holder 32 is lowered whereupon the lock pins 39, 39 on the front lugs 18, 18 of the bottom wall 33 of the holder 32 move downward toward the right end portions of the corresponding arms 92, 92 and then lower the right end portions simultaneously. Thus, the tape cassette loading unit assumes its locking position shown in FIG. 17(b).

More specifically, when the lock pins 39, 39 simultaneously lower the right end portions of the arms 92, 92 against the force of the torsion springs (not illustrated), the left end portions of the arms 92, 92 are released from the retaining engagement relative to the locking lugs 74, 74 of the lock plate 71, and the lock plate 71 is displaced rightward in FIG. 17(a) by the force of the tension spring 79 acting between the lock plate 71 and the bracket (not shown) secured to the front end of the frame 25. The rightward movement of the lock plate 71 is performed with the aid of the sliding engagement between the pins 91, 91 and the corresponding oblong holes 73, 73.

Figure 17B:
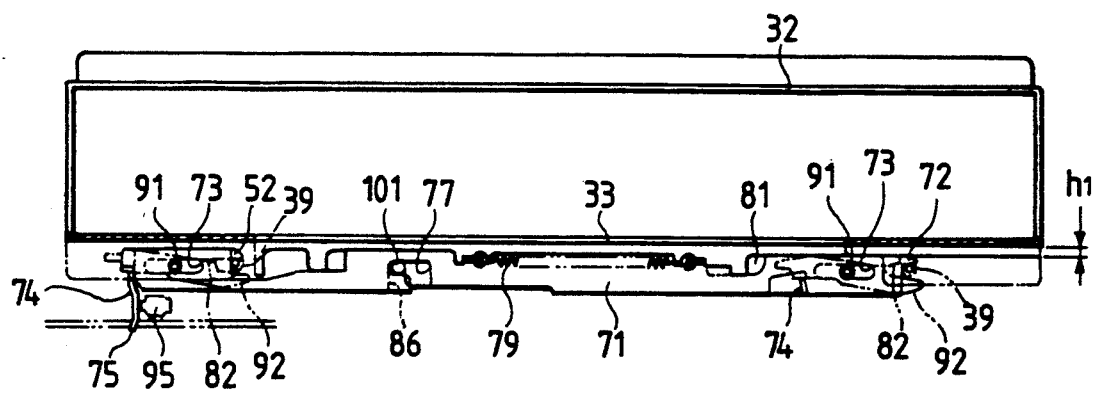
Figure 17C:
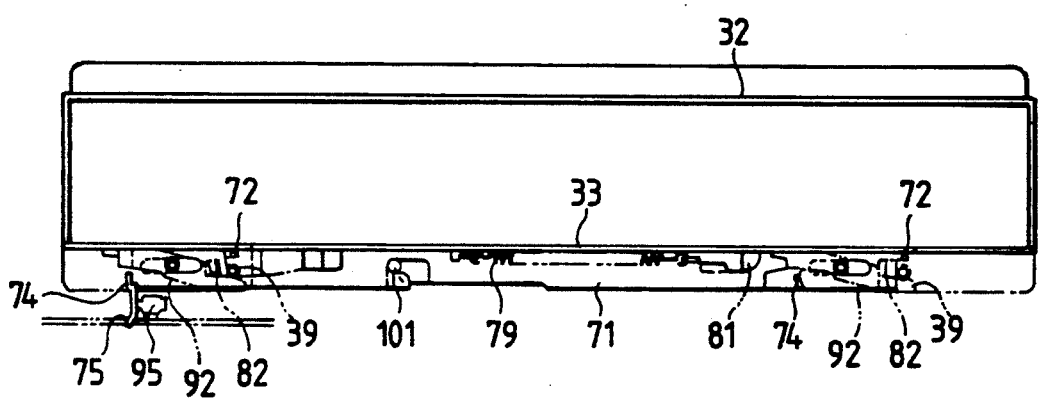

With this rightward movement of the lock plate 71, the locking prongs 72, 72 of the lock plate 71 are locked with the lock pins 39, 39, as shown in FIG. 17(b).

In order to ensure the locking operation, a downward overstroke h1 (FIG. 17(b)) is given to the movement of the holder 32. In the illustrated embodiment, the downward overstroke h1 is about 1.5 mm.

The overstroke is partly absorbed by a stroke absorbing mechanism so as to control an upward play or displacement of the holder 32.

When the holder 32 assumes its locking position shown in FIG. 17(b), the rightward movement of the lock plate 71 causes the switch actuating fin 75 to activate the loading switch 95, Upon activation of the loading switch 95, the motor 9 is driven to enable the tape loading mechanism to withdraw a magnetic tape from the tape cassette TC and also turn the cam gear 16 (FIG. 12) in the counterclockwise direction. With this angular movement of the cam gear 16, the eject lever 16-28 engaged with the cam groove 16-4 is turned counterclockwise about the shaft 16-27 and hence the pin 101 on the front end of the eject lever 16-28 moves rightward in FIG. 17(b).

Figure 17D:
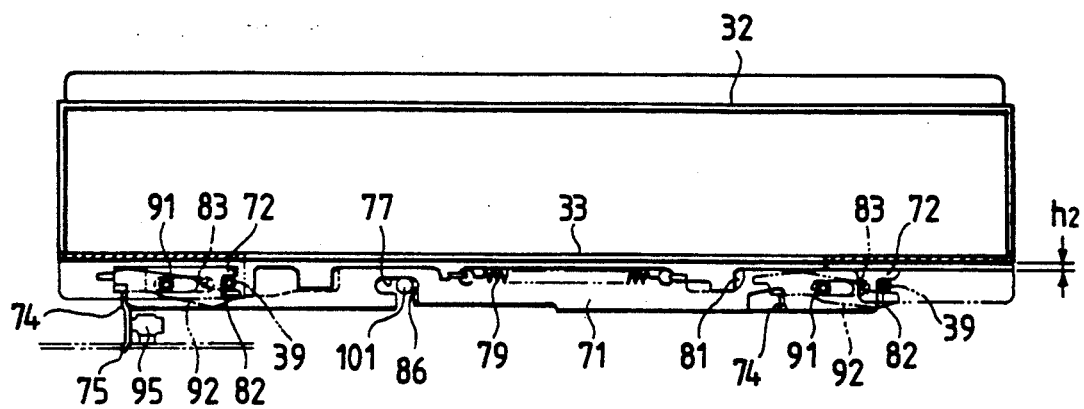

With this rightward movement of the pin 101, the slide plate 81 which is connected with the pin 101 via the cutout recess 86 moves rightward, as shown in FIG. 17(d), while the oblong holes 83, 83 are being guided on the corresponding pins 91, 91. The rightward movement of the pin 101 relative to the lock plate 71 is taken up or absorbed as it takes place within the length of the oblong hole 77.

In response to the rightward movement of the slide plate 81, the locking prongs 82, 82 on the slide plate 81 ride on the lock pins 39, 39 to slightly lower the pins 39, 39. Since the locking prongs 82 are disposed slightly below the locking prongs 71 on the lock plate 71 (by a distance of about 0.5 mm in the illustrated embodiment), the overstroke h1 (about 1.5 mm) shown in FIG. 17(b) is absorbed by this distance (about 0.5 mm). Thus, the overstroke is reduced to such an amount as indicated by h2 (about 1.0 mm) in FIG. 17(d).

The absorption of a part of the overstroke is performed when the motor is driven to withdraw the tape from the tape cassette TC. Since the lock pins 39, 39 are firmly locked by the locking prongs 82, 82 on the slide plate 81, the holder 32 is held by the slide plate 81 in a forcible locking condition shown in FIG. 17(d) even when a locking condition provided by the lock plate 71 is accidentally released due, for example, to falling of the magnetic recording and/or reproducing apparatus caused by handling errors.

Figure 17E:
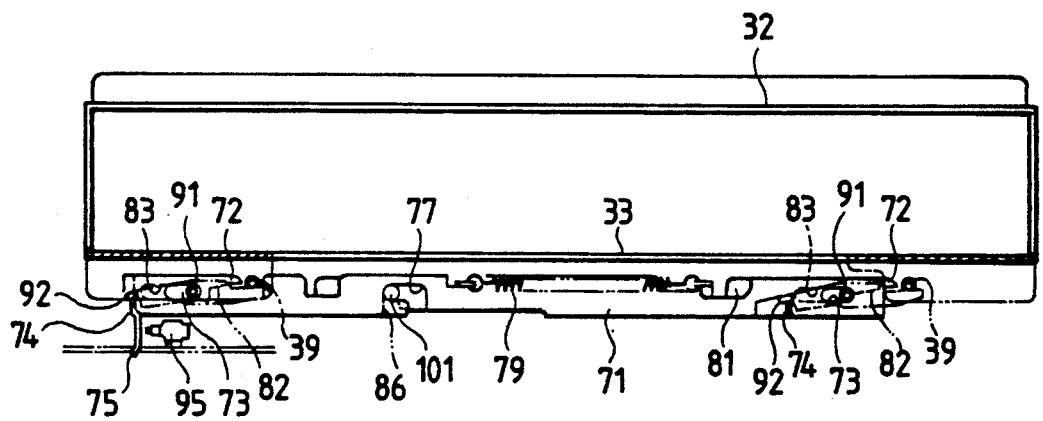

FIG. 17(e) shows an eject state. When a non-illustrated eject button is actuated, the motor 9 is driven in the reverse direction. Then, the tape is retracted in the tape cassette TC and the pin 101 is moved leftward by the action of the cam gear 16 and the eject lever 16-28.

With this leftward movement of the pin 101, the slide plate 81 which is engaged with the pin 101 via the cutout recess 86 moves leftward. At the same time, the lock plate 71 which is engaged with the pin 101 via the oblong hole 77 is displaced leftward.

The leftward movement of the slide plate 81 and the lock plate 71 simultaneously release the locking engagement between the lock pins 39, 39 and the locking prongs 72, 72 and also between the lock pins 39, 39 and the locking prongs 82, 82. At the same time, the switch actuating fin 75 is separated from the loading switch 95 to thereby de-activate the loading switch 95. Thus, the lock plate 71, the slide plate 81, and the arms 92, 92 are returned to the stand-by position shown in FIG. 17(a).

In response to the ejecting operation stated above, the upper arms 69 of the torsion springs 66 acting on the bottom wall 33 of the holder 32 urge the holder 32 upwardly, so that a start or cue to the upward movement of the holder 32 is given even when the support arms 49, 51 are still held in the folded, recumbent position extending along the side walls of the frame 25 of the deck 10. Thus, the torsion springs 66 constitute an urging means to excite or start the upward movement of the holder 32.

After the holder 32 is slightly lifted by the force of the torsion springs 66, the support arms 49, 51 are raised or extended by the force of the tension springs 59 with the result that the cassette housing 31 including the holder 32 is moved to an elevated stand-by position shown in FIG. 14.

During such pop-up operation, the damper 64 produces a damping force to ensure that the upward movement of the holder 32 takes place gently with a certain degree of registration.

As described above, the opening 34 formed in the bottom wall 33 of the holder 32 is receptive of an upper part of the deck 10 such that the upper wall of the deck 10 extends substantially flush with the bottom wall 33 of the holder 32 when the holder 32 is disposed in the locking position. Since the bottom wall 33 of the holder 32 does not lie over the upper wall of the deck 10, the holder 32 can be lowered to such an extent that the tape cassette TC is positioned close to the upper wall of the deck 10. With this construction, the overall thickness of the magnetic recording and/or reproducing apparatus such as a VTR can be reduced.

In addition, the pivoted support arms 49, 51 are fully folded on the opposite sides of the frame 25 of the deck 10 when the holder 32 is disposed in the locking position. Thus foldable support arms 49, 51 are particularly advantageous to the reduction of the thickness of the VTR.

Although the tape cassette loading unit in the illustrated embodiment is of the pop-up type, the present invention is also applicable to a tape cassette loading unit of the slide type in which the holder is reciprocated parallel to the deck.

Figure 18:
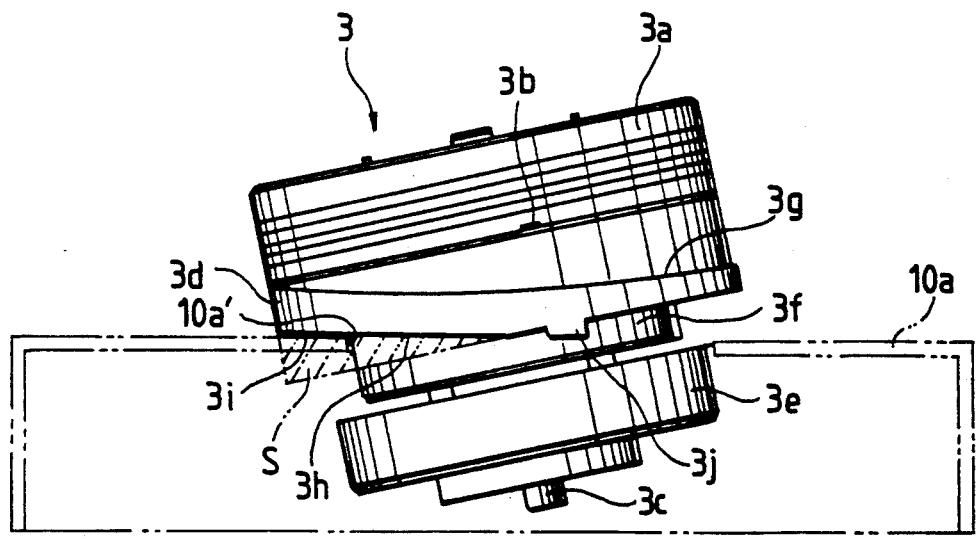
FIG. 18 is a side view of a rotary drum.

FIG. 18 shows the rotary drum 3 mounted on the main deck 10a in a tilted condition. The drum 3 generally comprises an upper rotatable drum 3a, a plurality of magnetic (video) heads 3b (only one shown), a rotating shaft 3c, a lower fixed drum 3d and a drive motor 3e.

The upper rotatably drum 3a is fixed to an upper portion of the rotating shaft 3c rotatably mounted on the lower fixed drum 3d. The rotating shaft 3c is connected at its lower end to the drive motor 3e. The magnetic (video) heads 3b are provided on the bottom surface of the upper rotatable drum 3a along the peripheral edge thereof in confronting relation to the upper surface of the lower fixed drum 3d. The lower fixed drum 3d has a bearing boss 3f.

The lower fixed drum 3d has a lead 3g formed on an outer peripheral surface thereof. The rotary drum 3 is mounted on the main deck 10a with its axis of rotation (i.e., a longitudinal axis of the rotating shaft 3c) tilted down toward main deck 10a. In operation, a magnetic tape (not shown) is wrapped around the rotary drum 3 in such a manner that the tape travels on and along the outer surfaces of the upper and lower drums 3a, 3d while a lower edge of the magnetic tape is guided by the lead 3f.

The outer peripheral surface of the lower fixed drum 3d is recessed or removed at a lower portion disposed below the lead 3g and along substantially a half of the full circumference thereof so as to form a sloped, substantially semi-circular ring-shaped step 3h. The sloped step 3h thus formed extends obliquely to the axis of rotation of the rotary drum 3. The sloped step 3h is formed with a thin mounting seat 3i, while the bottom surface is formed with a plurality of mounting legs 3j (only one shown).

When the lower fixed drum 3d is to be mounted on the main deck 10a, the bearing boss 3f and the drive motor 3e are disposed in an internal space of the main deck 10a through a mounting hole 10a'. Then the sloped step 3h is placed on the upper surface of the main deck 10a and, while keeping this condition, the mounting seat 3i and the mounting legs 3j are screwed to the main deck 10a.

Figure 21:
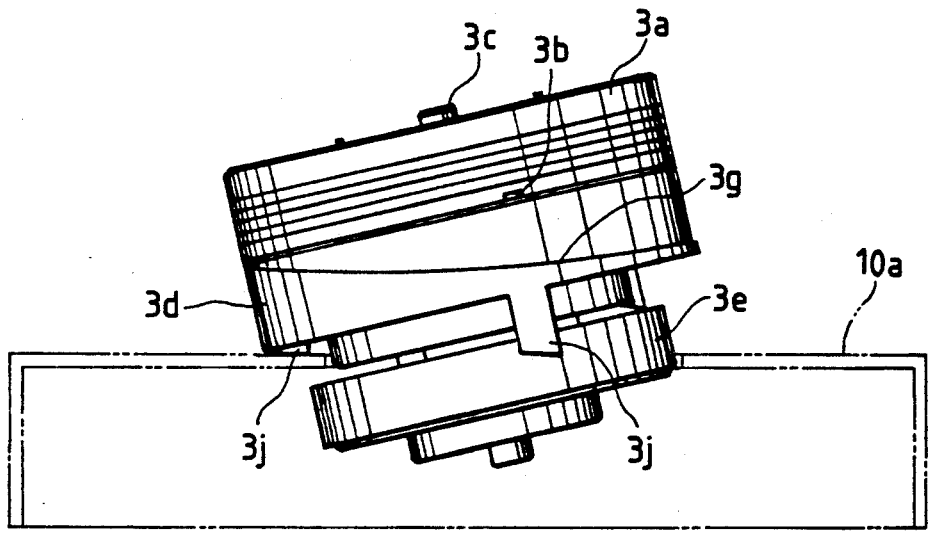
FIG. 21 is a side view showing the construction of a conventional rotary drum.

Since the sloped step 3h, formed by removing a bottom portion of the fixed drum 3d along substantially a half of the full circumference of the outer peripheral surface, is placed on the upper surface of the main deck 10a, the level of the lower fixed drum 3d is lowered by such an amount equal to the thickness of the removed bottom portion. Thus, the height of the rotary drum 3 mounted on the main deck 10a is smaller than the height of a conventional rotary drum devoid of the sloped step such as shown in FIG. 21. With this reduction of the thickness of the rotary drum, the overall thickness of the magnetic recording and/or reproducing apparatus such as the VTR can be reduced.

The sloped step 3h formed by removing a part of the fixed drum 3d provides an additional space S in which a component part such as a member of the tape loading mechanism can be disposed near the rotary drum 3. Thus, the degree of integration of the components (or the density of components per unit area) is increased and, therefore, the magnetic recording and/or reproducing apparatus can be constructed compactly.

Figure 19:
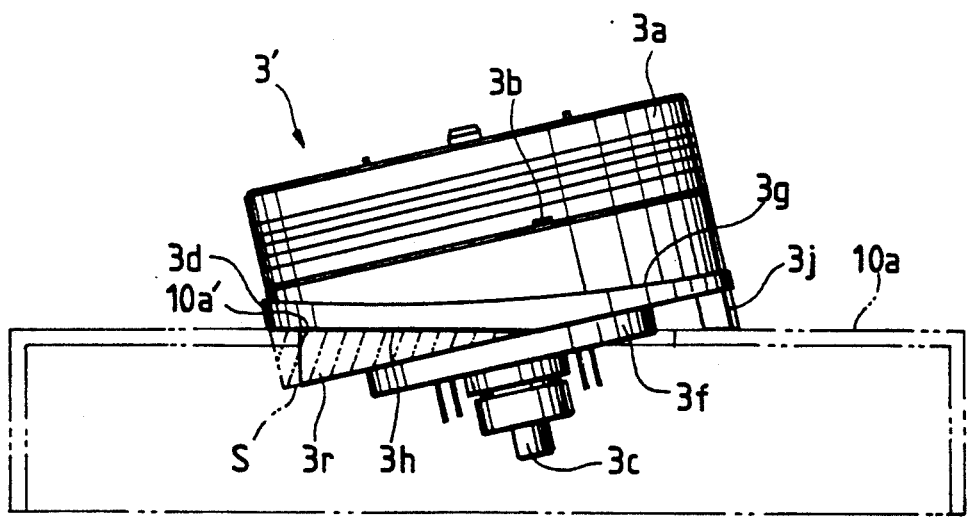
FIG. 19 is a side view of a rotary drum according to another embodiment.
Figure 20:
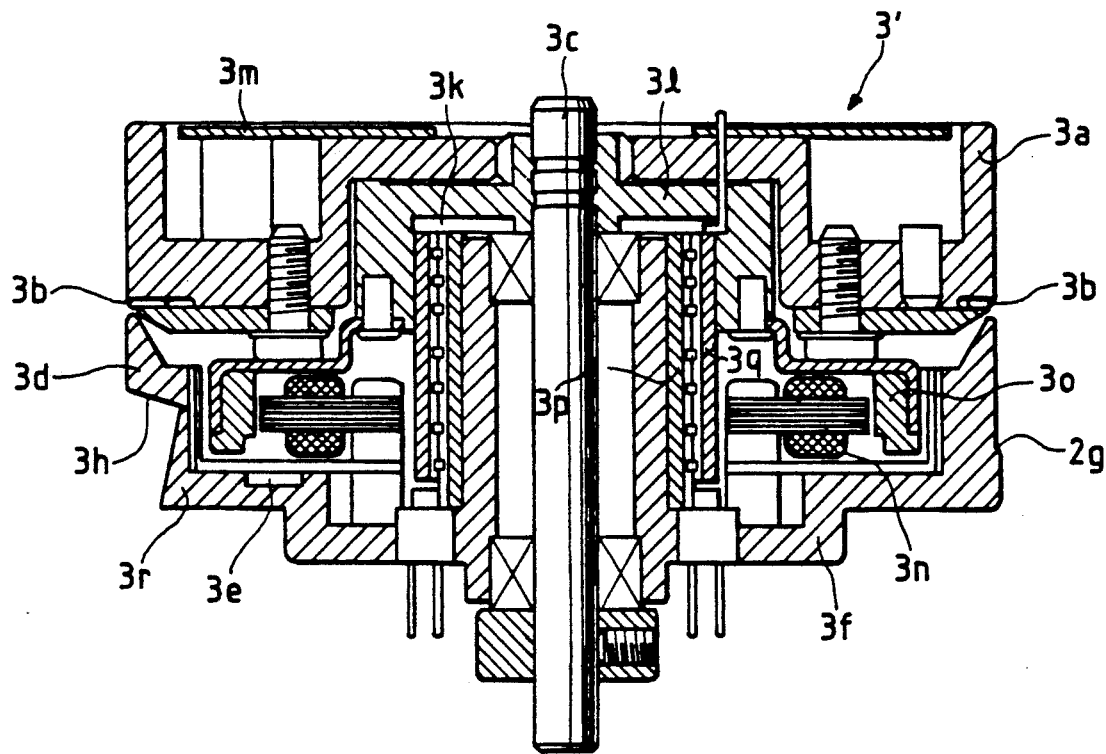
FIG. 20 is an axial cross-sectional view of the rotary drum shown in FIG. 19.

FIGS. 19 and 20 show a rotary drum 3' according to another embodiment of this invention. The rotary drum 3' includes a drive motor 3e and a rotary transformer 3k disposed within the rotary drum 3'.

As best shown in FIG. 20, the rotary drum 3' with a built-in drive motor 3e includes a rotating shaft 3c rotatably supported by a bearing boss 3f of a lower fixed drum 2d, a flywheel 3l fixedly mounted on an upper end portion of the rotating shaft 3c, and an upper rotatable drum 3a integrally connected to the flywheel 3l. Designated at 3b are magnetic video heads and at 3m is a substrate.

The drive motor 3e and the rotary transformer 3k are disposed between the lower fixed drum 3d and the flywheel 3l. The drive motor 3e is composed of a stator 3n disposed within the lower fixed drum 3d and a rotor 3o connected to the flywheel 3l and the upper rotatable drum 3a. The rotary transformer 3k is composed of a fixed member 3p disposed within the lower fixed drum 3d and a rotatable member 3q on the flywheel 3l side. The rotary transformer 3k thus constructed performs transmission of signals from the magnetic (video) heads 3b.

The outer peripheral surface of the lower fixed drum 3d of the rotary drum 3' is recessed or removed at a lower portion disposed below the lead 3g and along substantially a half of the full circumference thereof so as to form a sloped, substantially semi-circular ring-shaped step 3h. The sloped step 3h thus formed extends obliquely to the axis of rotation of the rotary drum 3. A plurality of mounting legs 3j (only one shown in FIG. 19) are provided on the bottom surface of the lower fixed drum 3d. In FIGS. 19 and 20, the reference character 3r designates a motor case disposed below the sloped step 3h.

To mount the lower fixed drum 3d on the main deck 10a, the bearing boss 3f and the motor case 3r are disposed in an internal space of the main deck 10a through a mounting hole 10a'. Then the sloped step 3h is placed on the upper surface of the main deck 10a and, while keeping this condition, the sloped step 3h and the mounting legs 3j are screwed to the main deck 10a.

The rotary drum 3' with a built-in motor 3e is low in profile as the lower fixed drum 3d having a sloped step 3h can be mounted at a lower level than the conventional rotary drum. In addition, the sloped step 3h provides a space S (FIG. 19) which can be used for arranging other members near the bottom of the rotary drum 3'. The rotary drum 3' with a built-in motor 3e is thinner than the rotary drum 3 shown in FIG. 18 so that an additional reduction of the thickness of the magnetic recording and/or reproducing apparatus can be attained.

The tape tension servo mechanism will be described below in greater detail with reference to FIGS. 22, 23 and 24(a)–24(c). As is already described above with reference to FIG. 5, the tension pole 15-17 is upstanding from the front end of the tension arm 15-16. The tension arm 15-16 has at its proximal end a tubular boss 15-16b extending downwardly through the upper main deck 10a and rotatably mounted on a support shaft 15-16c upstanding from the lower deck 10b. The tension pole 15-17 is brought into contact with a magnetic tape T (FIG. 23) by the force of the tension spring 15-15. The support shaft 15-16c rotatably supports thereon a pinion gear 15-16a connected with a lower end portion of the boss 15-16b for co-rotation therewith.

The shaft 15-13 projects upwardly from the lower deck 10b for rotatably supporting thereon the transfer arm 15-14. The transfer arm 15-14 has a sector gear 15-14a extending concentrically to the shaft 15-13 at one side of the shaft 15-13 and held in mesh with the pinion gear 15-16a on the tension arm 15-16. An abutment 15-14b is formed at one end of the sector gear 15-14a and is engageable with the cancel arm 15-12. The transfer arm 15-14 is connected to opposite end of a brake band 15-18 at the opposite side of the sector gear 15-14a. One end of the tension spring 15-15 is connected to the transfer arm 15-14 adjacent to the opposite ends of the brake band 15-18. The brake band 15-18 is wrapped around the supply reel disc 1. The opposite end of the tension spring 15-15 is connected to the lower deck 10b so that the spring 15-15 urges the transfer arm 15-14 to turn clockwise in FIG. 22 about the shaft 15-13. The transfer arm 15-14 turns in unison with the tension arm 15-16. The clockwise rotation of the transfer arm 15-14 tightens the brake band 15-18, thereby exerting a brake force on the supply reel disc 1.

The cancel arm 15-12 is disposed below the cam gear 15 and has one end pivotally connected to the lower deck 10b by means of the shaft 15-11. The opposite end of the cancel arm 15-12 is formed with an actuating projection 15-12a. The cancel arm 15-12 further has a cam 15-12b at one side thereof. In response to rotation of the cam gear 15, the cam 15-2 acts on the cam 15-12b to turn the cancel arm 15-12 about the shaft 15-11 in a direction so that the actuating projection 15-12a engages the abutment 15-14b and urges the transfer arm 15-14 to turn counterclockwise in FIG. 23 against the force of the tension spring 15-15, thereby loosening the brake band 15-18. The cam gear 15 on which the cam 15-2 is formed is driven by the motor 9 (FIG. 3) via the gear train.

The tape tension servo mechanism of the foregoing construction will operate as follows.

Figure 24A:
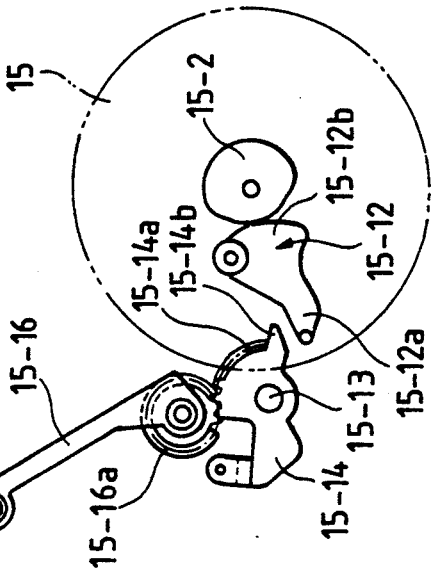
FIGS. 24(a) through 24(c) are diagrammatical views illustrative of the operation of the tension servo mechanism.

The cam gear 15 having the cam 15-2 is turned by the motor 9 (FIG. 3) through a predetermined angular distance which is equivalent to a selected operation mode. In response to the rotation of the cam gear 15, the cancel arm 15-12 is turned to assume a corresponding angular position. For example, when an eject (EJECT) mode is selected, the transfer arm 15-14 is turned clockwise by the spring 15-15 so that the abutment 15-14b is brought into engagement with the actuating projection 15-12a of the cancel arm 15-12, as shown in FIG. 24(a). In the EJECT mode, the tension arm 15-16 is fully turned in the clockwise direction so that the tension pole 15-17 is located within a recess in the tape cassette (see FIG. 9), thereby permitting the tape cassette to be loaded in and removed from the apparatus.

Figure 22:
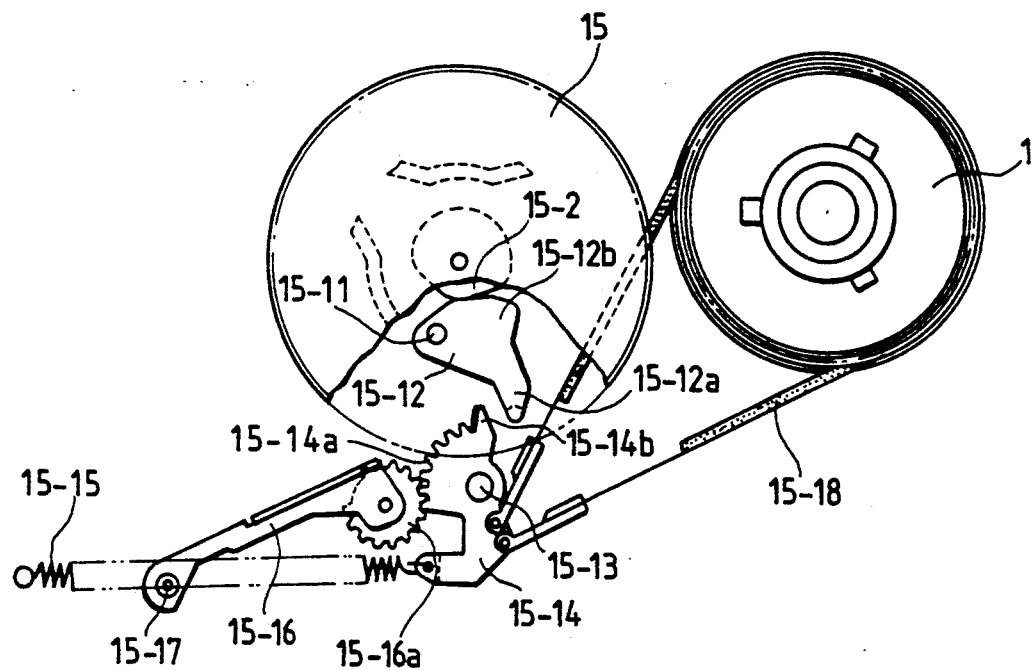
FIG. 22 is a detailed plan view of a tension servo mechanism.
Figure 23:
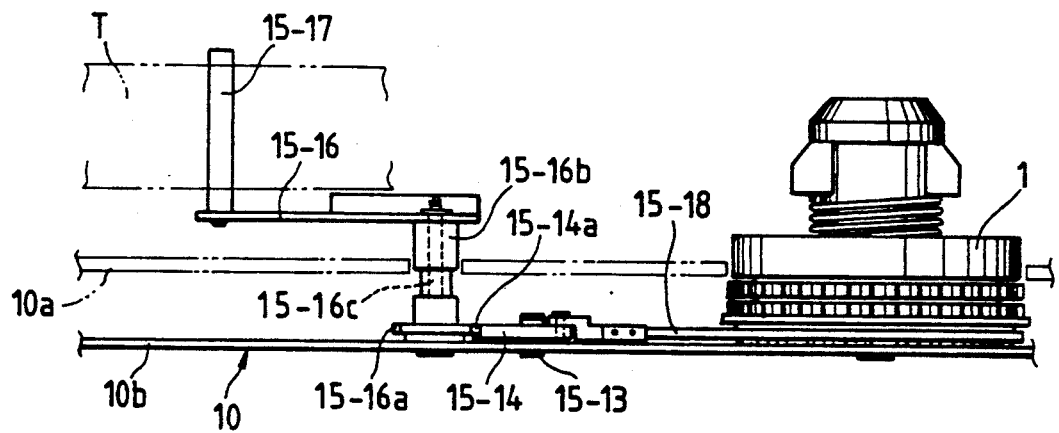
FIG. 23 is a side view of the tension servo mechanism.
Figure 24B:
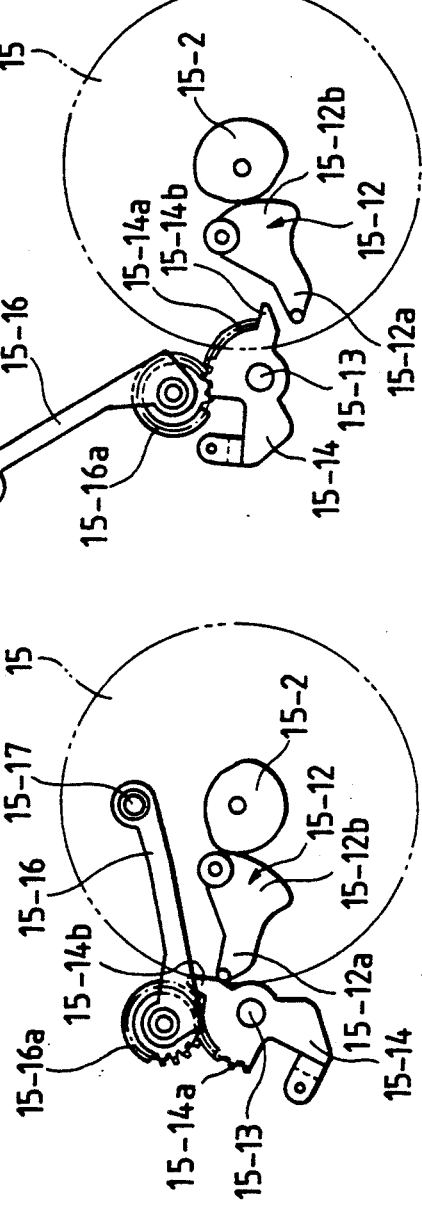
Figure 24C:
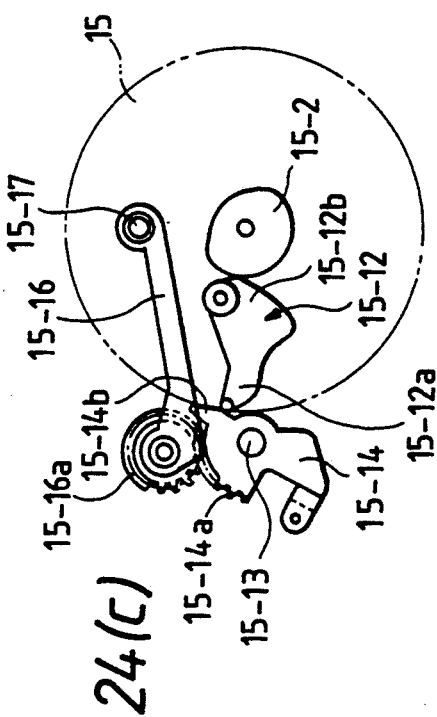

When a play button is actuated, the cam 15-2 turns clockwise by a predetermined angle, while at the same time, the cancel arm 15-12 turns in counterclockwise direction by the same angle. With this counterclockwise rotation of the cancel arm 15-12, the actuating projection 15-12a separates from the abutment on the transfer arm 15-14, as shown in FIG. 24(b). The transfer arm 15-14 is then turned clockwise by the force of the spring 15-15 (FIG. 22). Since the pinion gear 15-16a on the tension arm 15-16 meshes with the sector gear 15-14a of the transfer arm 15-14, the tension arm 15-16 turns in the counterclockwise direction in response to angular movement of the transfer arm 15-14. The tension pole 15-17 is brought into contact with the magnetic tape (FIG. 23). In response to the tension on the magnetic tape T, the tension arm 15-16 oscillates in unison with the transfer arm 15-14 to tighten or loosen the brake band 15-18, thereby exerting a proper braking force on the supply reel disc 1 to control the tension on the tape at a constant value. When the tension on the tape T is large, the transfer arm 15-14 turns counterclockwise in FIG. 24(b) to loosen the brake band 15-18. On the other hand, when the tension on the tape T is small, the transfer arm 15-14 turns clockwise to tighten the brake band 15-18.

As described above, the transfer arm 15-14 of the tape tension servo mechanism oscillates in unison with the tension arm 15-16 through the meshing engagement between the gears 15-14a and 15-16a. In response to oscillation of the transfer arm 15-16, the brake band 15-18 is selectively tightened and loosened to exert a braking force on the supply reel disc 1. Since the brake band 15-18 is not directly connected to the tension arm 15-16, an increased degree of freedom is available in arranging the brake band 15-18.

Then, an REW mode button is actuated whereupon the cam 15-2 is turned in the clockwise direction in FIG. 24(b), thereby turning the cancel arm 15-12 in the same direction. With this clockwise rotation of the cancel arm 15-12, the actuating projection 15-12a is brought into engagement with the abutment 15-14b on the transfer arm 15-14 and then urges the transfer arm 15-14 to turn counterclockwise direction. In response to the counterclockwise rotation of the transfer arm 15-14, the tension arm 15-16 turns clockwise. The tension pole 15-17 is retracted again into the recess in the tape cassette. Now, the tape T can be rewound at a high speed.

In the illustrated embodiment, the gear 15-16 on the tension arm 15-16 held in direct mesh with the gear 15-14a on the transfer arm 15-14, they may be interlocked together via a gear train including idler gears. The amount of angular movement of the tension arm 15-16 decreases with an increase in length of the tension arm 15-16. The angular movement can be limited within a certain range by adequately adjusting the gear ratio between the pinion gear 15-16a and the sector gear 15-14a. The amount of play of the brake band 15-18 can, therefore, be controlled properly.

FIGS. 25 through 27 show the capstan 4 and a structure for holding a capstan shaft of the capstan, in particular.

The capstan 4 includes a tubular holder 4a rotatably holding therein a capstan shaft 4b. The tubular holder 4a has a longitudinal slot 4c extending between an upper end portion and a lower end portion of the holder 4a. The holder 4a thus slotted has a substantially semicircular ring-shaped cross-section such as shown in FIG. 27. The peripheral surface of the capstan shaft 4b partly projects from the slot 4c. The upper end portion of the holder 4a retains therein a first bearing 4d (FIG. 26), while the lower end portion of the holder 4a retains therein a second bearing 4e (FIG. 26). The first bearing 4d has an inside diameter of 1.5 mm and smaller in diameter than the second bearing 4e having an inside diameter of 3.53 mm. The first bearing 4d is preferably made of an oilless metal. The outer peripheral surface of the holder 4a is coated with a low friction resin film 4f to avoid abrasion which would otherwise occur due to frictional engagement with tape cassettes. The low friction resin may be a fluororesin such as polytetrafluoroethylene and the thickness of the low friction resin film 4f is in the range of from 15–50 μm. Experiments indicated that a 30 μm low friction resin film 4f coated on a die-cast holder had a surface roughness of 8 μm, a friction coefficient of 0.2 and a surface hardness of 15 Hv (Vickers hardness). This was a clear contrast to a conventional non-treated die-cast holder (free of a low friction resin film) which was 16 μm in surface roughness, 0.8 in friction coefficient and 15 Hv in Vickers hardness.

The holder 4a is firmly fitted with an annular base 10c and then joined with the base 10c by fusing or brazing. The capstan shaft 4b is then inserted into the holder 4a from the bottom end thereof.

As shown in FIG. 26, the capstan shaft 4b has an upper end 4g of a reduced diameter fitted in the small-diameter first bearing 4d. The capstan shaft 4b is also rotatably supported at its lower portion 4h by the large-diameter second bearing 4e.

The capstan motor 7 secured to the underside of the base 10c and includes a stator coil 7a, a rotor 7b integrally connected to the capstan shaft 3b, a magnet 7c on the rotor 7b and a connector 7d (FIG. 25). The capstan motor 7 thus constructed drives the capstan shaft 4b.

The capstan 4 is secured by screw fasteners F to the main deck 10a together with the capstan motor 7.

The operation of the capstan 4 will be described below with reference to FIG. 26.

A tape cassette TC indicated by phantom lines is lowered to a predetermined position by means of the cassette loading unit, not shown. During that time, a guard plate GP is tilted up and a magnetic tape T is withdrawn from the tape cassette TC and held at the right side of the capstan shaft 4b. The magnetic tape T is then urged by the pinch roller 5 against the capstan 4.

Figure 28:
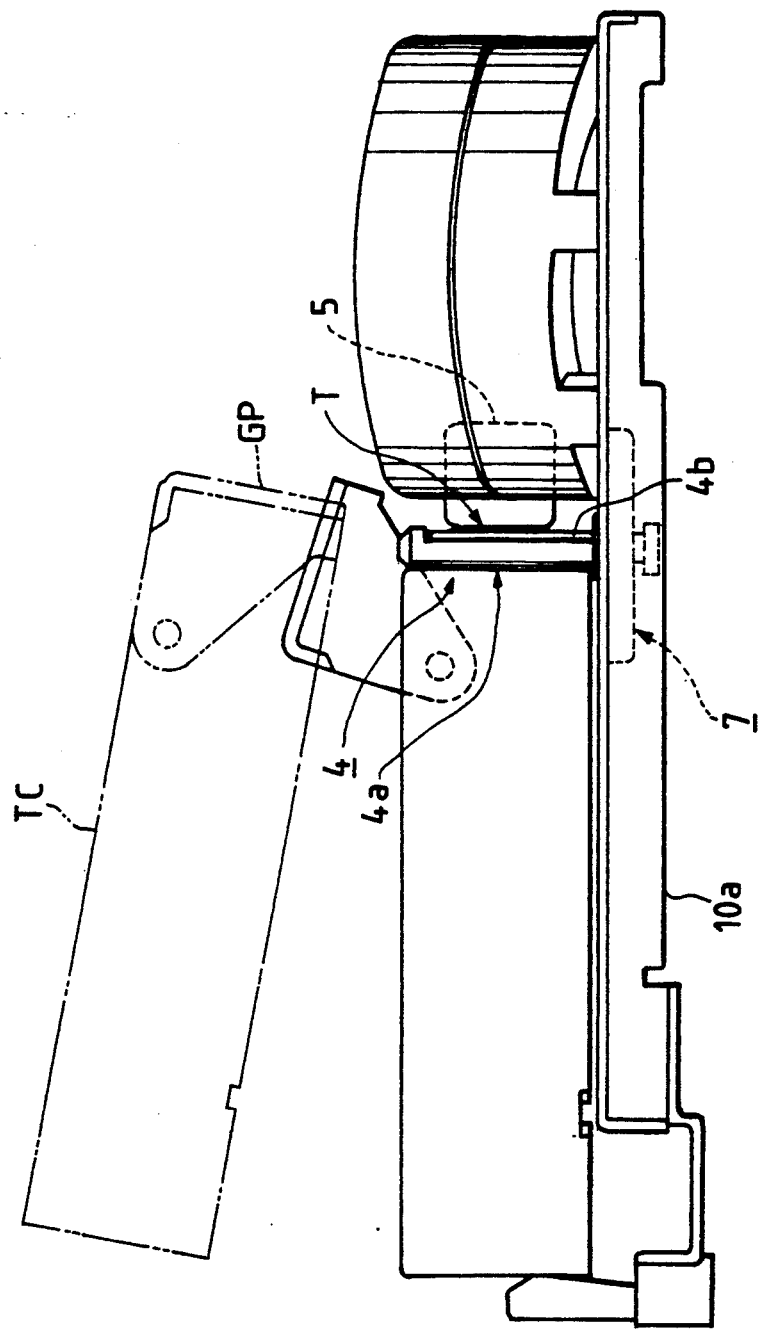
FIG. 28 is a diagrammatical side view illustrative of the operation of the capstan holding structure.
Figure 29A:
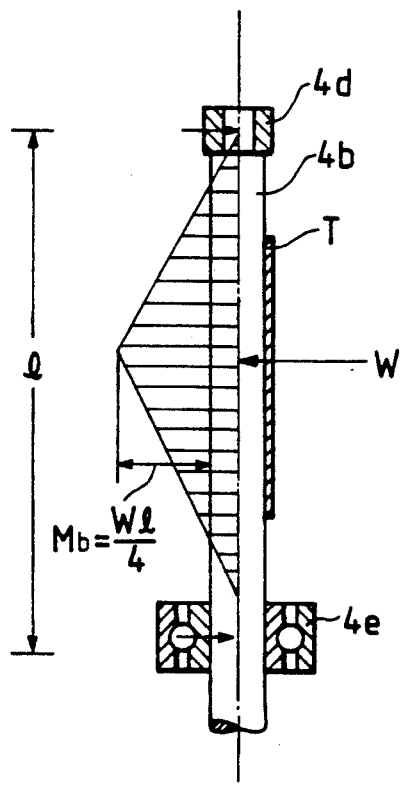
FIG. 29(a) is a diagrammatical view explanatory of the rigidity of a capstan shaft according to the present invention.
Figure 29B:
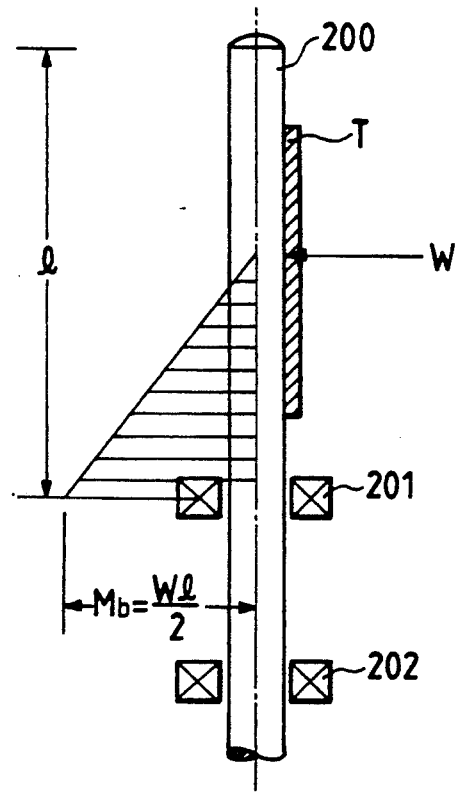
FIG. 29(b) is a diagrammatical view illustrative of the rigidity of a conventional capstan shaft.

FIG. 29(a) diagrammatically shows the rigidity of the capstan shaft 3b of the present invention as compared to the rigidity of a conventional shaft shown in FIG. 29(b). When the capstan shaft 3b is subjected to a lateral bending force W exerted by the magnetic tape T and the capstan 5 (FIG. 28), a bending moment (Mb) is given by the following equation $$Mb = Wl/4$$

where l is the span or distance between the first and second bearings 4d, 4e. Similarly, a maximum deflection (τ) of the capstan shaft 3b is given by the following equation $$\tau = Wl^3/48EI$$

where E is the Young's modulus of elasticity, and I is the moment of inertia of area. For purposes of simplicity in calculation, it is assumed that the lateral bending force is concentrated on the 1/2 point of the capstan shaft 3b.

In the case of the conventional capstan shaft 200 such as shown in FIG. 29(b), a bending moment (Mb) created at the proximal end of the capstan shaft 200 is given by the following equation $$Mb = Wl/2$$

where l is the effective length of a cantilevered capstan shaft 200. Similarly, a maximum deflection ($\tau$) created at the free end of the capstan shaft 200 is given by the following equation $$\tau = 5Wl^3/48EI.$$

For purposes of simplification of calculation, the capstan shaft 200 is regarded as a cantilevered shaft supported by an upper bearing 201 instead of in combination with a lower bearing 202.

It appears clear from the foregoing description, the bending moment of the capstan shaft 3b of the present invention is cut in half as compared to the bending moment of the conventional capstan shaft 200. Likewise, a substantial reduction in the deflection is attained by the capstan shaft 3b of the invention.

The upper end portion 4g of the capstan shaft 3b is considerably smaller in diameter than the lower end portion 4h, however, this portion is unlikely to deform because the bending stress created at that portion is considerably small as readily understood from FIG. 29(a). The upper end portion 4g of the reduced diameter which is used in combination with the small-diameter bearing 4d makes it possible to reduce the inside diameter of the holder 3a and therefore the overall size of the capstan 4.

Obviously, various minor changes and modifications of the present invention are possible in the light of the above teaching. It is therefore to be understood that within the scope of the appended claims the invention may be practiced otherwise than as specifically described.

What is claimed is:

1. A magnetic recording and/or reproducing apparatus of the type including a drum having a rotary magnetic head, a supply reel disc and a take-up reel disc for being engaged by a supply reel and a take-up reel, respectively, of a magnetic tape cassette, a capstan driven by a capstan motor and co-acting with a pinch roller to travel a tape between the supply and take-up reels, a reel clutch mechanism for transmitting a driving force from the capstan motor to the reel discs, a tape loading mechanism for withdrawing a length of the magnetic tape from the tape cassette and wrapping the tape length around the drum by a predetermined rotational angle, a tape tension servo mechanism for controlling a tension on the tape at a predetermined level, a pinch roller displacement mechanism for moving the pinch roller toward and away from the capstan, a brake mechanism for braking the reel discs, and a drive mechanism for transmitting a driving force of a motor to a driven member of each of said tape loading mechanism, said tape tension servo mechanism, said pinch roller displacement mechanism and said brake mechanism to drive these mechanisms, all of the foregoing components and mechanisms being supported on a deck, characterized in that said drum is disposed substantially in front of said supply reel disc, said capstan and said pinch roller are disposed substantially in front of said take-up reel disc, said reel clutch mechanism extends from said capstan to a position located between said supply reel disc and said take-up reed disc, and said drive mechanism includes a gear train composed of a plurality of cam gears meshing with each other, each of said cam gears having at least one cam operatively connected with the driven member of each of said tape loading mechanism, said tape tension servo mechanism, said pinch roller displacement mechanism and said brake mechanism for controlling operation of the respective mechanisms, said gear train being disposed in a space extending arcuately along said drum and defined between said drum, said supply reel disc, said reel clutch mechanism and said capstan.

2. A magnetic recording and/or reproducing apparatus according to claim 1 wherein said deck is composed of an upper main deck and a lower deck superimposed with each other with a space defined therebetween, said drive mechanism being disposed in said space in said deck.

3. A magnetic recording and/or reproducing apparatus according to claim 2 wherein said driven member and said capstan motor are disposed in said space in said deck.

4. A magnetic recording and/or reproducing apparatus according to claim 1 wherein said rotary drum includes an upper rotatable drum and a lower fixed drum assembled together with said magnetic head disposed therebetween, said lower fixed drum being secured to said deck with an axis of said drum tilted with respect to said deck, said lower fixed drum having on its outer peripheral surface a lead for guiding a magnetic tape as the magnetic tape travels along said drum, said outer peripheral surface of said lower fixed drum being recessed at a lower portion disposed below said lead so as to form a sloped step, said sloped step being disposed on said deck.

5. A magnetic recording and/or reproducing apparatus according to claim 4 wherein said sloped step extends arcuately along substantially a half of the full circumference of the outer peripheral surface of said lower fixed drum.

6. A magnetic recording and/or reproducing apparatus according to claim 4 wherein said rotary drum further includes a drive motor disposed below said lower fixed drum for rotating said upper rotatable drum and said magnetic head.

7. A magnetic recording and/or reproducing apparatus according to claim 4 wherein said rotary drum further includes a built-in-drive motor disposed within said rotary drum.

8. A magnetic recording and/or reproducing apparatus according to claim 1 wherein said tape tension servo mechanism includes a tension arm pivotally mounted on said deck and having a first gear concentric with a pivot axis of said tension arm, a transfer arm pivotally mounted on said deck and having a second gear meshing with said first gear, a brake band wrapped around said supply reel disc and connected at opposite ends to said transfer arm, a tension pole supported on a distal end of said tension arm, and a spring for urging said tension pole into contact with tape as the tape is wrapped around said rotary drum.

9. A magnetic recording and/or reproducing apparatus according to claim 1 wherein said capstan includes a tubular holder secured to said deck and having a longitudinal slot extending between an upper end portion and a lower end portion of said holder, a capstan shaft rotatably received in said holder and driven by said capstan motor, said capstan shaft having an upper end portion smaller in diameter than a lower end portion thereof, a first bearing held in said upper end portion of said holder and rotatably supporting said upper end portion of said capstan shaft, and a second bearing held in said lower end portion of said holder and rotatably supporting said lower end portion of said capstan shaft, said second bearing having a larger inside diameter than said first bearing.

10. A magnetic recording and/or reproducing apparatus according to claim 9 wherein said tubular holder has a film of low friction resin coated on an outer peripheral surface thereof.

11. A magnetic recording and/or reproducing apparatus according to claim 10 wherein said low friction resin film has a thickness ranging from 15 to 50 μm.

12. A magnetic recording and/or reproducing apparatus of the type including a drum having a rotary magnetic head, a supply reel disc and a take-up reel disc for being engaged by a supply reel and a take-up reel, respectively, of a magnetic tape cassette, a capstan driven by a capstan motor and co-acting with a pinch roller to travel a tape between the supply and take-up reels, a reel clutch mechanism for transmitting a driving force from the capstan motor to the reel discs, a tape loading mechanism for withdrawing a length of the magnetic tape from the tape cassette and wrapping the tape length around the drum by a predetermined rotational angle, a tape tension servo mechanism for controlling a tension on the tape at a predetermined level, a pinch roller displacement mechanism for moving the pinch roller toward and away from the capstan, a brake mechanism for braking the reel discs, and a drive mechanism for transmitting a driving force of a motor to each of the tape loading mechanism, said tape tension servo mechanism, said pinch roller displacement mechanism and said brake mechanism to drive the latter, a deck supporting all of said components and mechanisms, a holder for receiving therein the tape cassette, and a support mechanism for supporting said holder such that said holder is movable toward and away from said deck, characterized in that said deck is composed of an upper main deck and a lower deck jointed together with a space defined therebetween, said drive mechanism is disposed in said space in said deck, and said holder includes a bottom wall having an opening, said opening being receptive of an upper wall of said main deck until said upper wall extends substantially flush with said bottom wall of said holder when said holder is disposed near said deck.

13. A magnetic recording and/or reproducing apparatus according to claim 12 wherein said rotary drum includes an upper rotatable drum and a lower fixed drum assembled together with said magnetic head disposed therebetween, said lower fixed drum being secured to said deck with an axis of said drum tilted with respect to said deck, said lower fixed drum having on its outer peripheral surface a lead for guiding a magnetic tape as the magnetic tape travels along said drum, said outer peripheral surface of said lower fixed drum being recessed at a lower portion disposed below said lead so as to form a sloped step, said sloped step being disposed on said deck.

14. A magnetic recording and/or reproducing apparatus according to claim 13 wherein said sloped step extends arcuately along substantially a half of the full circumference of the outer peripheral surface of said lower fixed drum.

15. A magnetic recording and/or reproducing apparatus according to claim 13 wherein said rotary drum further includes a drive motor disposed below said lower fixed drum for rotating said upper rotatable drum and said magnetic head.

16. A magnetic recording and/or reproducing apparatus according to claim 13 wherein said rotary drum further includes a built-in drive motor disposed within said rotary drum.

17. A magnetic recording and/or reproducing apparatus according to claim 12 wherein said tape tension servo mechanism includes a tension arm pivotally mounted on said deck and having a first gear concentric with a pivot axis of said tension arm, a transfer arm pivotally mounted on said deck and having a second gear meshing with said first gear, a brake band wrapped around said supply reel disc and connected at opposite ends to said transfer arm, a tension pole supported on a distal end of said tension arm, and a spring for urging said tension pole into contact with tape as the tape is wrapped around said rotary drum.

18. A magnetic recording and/or reproducing apparatus according to claim 12 wherein said capstan includes a tubular holder secured to said deck and having a longitudinal slot extending between an upper end portion and a lower end portion of said holder, a capstan shaft rotatably received in said holder and driven by said capstan motor, said capstan shaft having an upper end portion smaller in diameter than a lower end portion thereof, a first bearing held in said upper end portion of said holder and rotatably supporting said upper end portion of said capstan shaft, and a second bearing held in said lower end portion of said holder and rotatably supporting said lower end portion of said capstan shaft, said second bearing having a larger inside diameter than said first bearing.

19. A magnetic recording and/or reproducing apparatus according to claim 18 wherein said tubular holder has a film of low friction resin coated on an outer peripheral surface thereof.

20. A magnetic recording and/or reproducing apparatus according to claim 19 wherein said low friction resin film has a thickness ranging from 15 to 50 μm.

* * * * *